(12) United States Patent
Liu et al.

(10) Patent No.: US 12,423,975 B2
(45) Date of Patent: Sep. 23, 2025

(54) ACTION LOCALIZATION METHOD, DEVICE, ELECTRONIC EQUIPMENT, AND COMPUTER-READABLE STORAGE MEDIUM

(71) Applicant: SAMSUNG ELECTRONICS CO., LTD., Suwon-si (KR)

(72) Inventors: Shizhuo Liu, Beijing (CN); Jingjun Jiao, Beijing (CN); Xiaobing Wang, Beijing (CN); Lanlan Zhang, Beijing (CN); Wei Li, Beijing (CN); Haifeng Zhang, Beijing (CN); Zhezhu Jin, Beijing (CN); Wei Wen, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 521 days.

(21) Appl. No.: 17/843,603

(22) Filed: Jun. 17, 2022

(65) Prior Publication Data

US 2022/0327834 A1 Oct. 13, 2022

Related U.S. Application Data

(63) Continuation of application No. PCT/KR2022/000532, filed on Jan. 12, 2022.

(30) Foreign Application Priority Data

Jan. 12, 2021 (CN) .......................... 202110038254.2
Jul. 26, 2021 (CN) .......................... 202110845122.0

(51) Int. Cl.
*G06V 20/40* (2022.01)
*G06T 7/246* (2017.01)
*G06V 40/20* (2022.01)

(52) U.S. Cl.
CPC .............. *G06V 20/46* (2022.01); *G06T 7/248* (2017.01); *G06V 40/20* (2022.01); *G06T 2207/30196* (2013.01)

(58) Field of Classification Search
CPC ........ G06V 20/46; G06V 20/40; G06V 20/44; G06V 20/42; G06V 40/20; H04N 5/2625
See application file for complete search history.

(56) References Cited

U.S. PATENT DOCUMENTS 8,331,451 B2  12/2012  Bang et al.
10,133,914 B2  11/2018  Hanina et al.
(Continued)

FOREIGN PATENT DOCUMENTS

CN  111757175 A  10/2020
JP  6913303 B2  8/2021
(Continued)

OTHER PUBLICATIONS

Fuchen Long "Gaussian Temporal Awareness Networks for Action Localization" (Year: 2019).*
(Continued)

*Primary Examiner* — Andrew M Moyer
*Assistant Examiner* — Ahmed A Nasher
(74) *Attorney, Agent, or Firm* — Sughrue Mion, PLLC

(57) ABSTRACT

An action localization method, device, electronic equipment, and computer-readable storage medium are provided. The action localization method includes: identifying at least one target video segment containing a target object in a video; acquiring a first action recognition result of at least one image frame in the at least one target video segment and a second action recognition result of the target video segment; and acquiring an action localization result of the video based on the first action recognition result and the second action recognition result.

19 Claims, 27 Drawing Sheets

(56) References Cited

U.S. PATENT DOCUMENTS

| | | |
|---|---|---|
| 10,510,234 B2 | 12/2019 | Danielsson et al. |
| 10,614,854 B2 | 4/2020 | Owen et al. |
| 10,691,949 B2 | 6/2020 | Danielsson et al. |
| 10,915,741 B2 | 2/2021 | Tang et al. |
| 11,450,027 B2* | 9/2022 | Zhang ................. G06V 40/166 |
| 2005/0228849 A1 | 10/2005 | Zhang |
| 2019/0065908 A1 | 2/2019 | Lee et al. |
| 2019/0089923 A1 | 3/2019 | Katano et al. |
| 2019/0138798 A1 | 5/2019 | Tang et al. |
| 2019/0147284 A1 | 5/2019 | Gavrilyuk et al. |
| 2019/0182436 A1* | 6/2019 | Gupta .................... H04N 5/272 |
| 2019/0311202 A1* | 10/2019 | Lee .......................... G06T 9/002 |
| 2019/0325275 A1 | 10/2019 | Lee et al. |
| 2019/0355126 A1* | 11/2019 | Sun .......................... G06T 3/16 |
| 2020/0272823 A1 | 8/2020 | Liu et al. |
| 2021/0056684 A1* | 2/2021 | Zhou ...................... G06V 10/82 |
| 2022/0138536 A1* | 5/2022 | Li .......................... G06N 3/045 |
| | | 706/25 |
| 2022/0215198 A1* | 7/2022 | Panda ..................... G06N 3/08 |

FOREIGN PATENT DOCUMENTS

| | | |
|---|---|---|
| KR | 10-2221792 B1 | 3/2021 |
| WO | 2018/192570 A1 | 10/2018 |

OTHER PUBLICATIONS

Extended European Search Report dated May 21, 2024, issued by the European Patent Office in European Application No. 22739652.0.

International Search Report (PCT/ISA/210) issued Apr. 28, 2022 by the International Searching Authority in International Patent Application No. PCT/KR2022/000532.

Written Opinion (PCT/ISA/237) issued Apr. 28, 2022 by the International Searching Authority in International Patent Application No. PCT/KR2022/000532.

* cited by examiner

FIG. 11A

| TYPE | RUNNING | JUMPING | EATING | WALKING |
|---|---|---|---|---|
| SUB-VIDEO SEGMENT SCORE | 0.13 | 0.76 | 0.05 | 0.06 |
| SCORE OF EACH FRAME | 0.05 | 0.88 | 0.05 | 0.2 |
| | 0.02 | 0.95 | 0.02 | 0.01 |
| | ... | ... | ... | ... |
| | 0.35 | 0.21 | 0.32 | 0.25 |

# ACTION LOCALIZATION METHOD, DEVICE, ELECTRONIC EQUIPMENT, AND COMPUTER-READABLE STORAGE MEDIUM

CROSS-REFERENCE TO RELATED APPLICATIONS

This application is a by-pass continuation of International Application No. PCT/KR2022/000532 filed Jan. 12, 2022 which claims priority to CN Patent Application No 202110038254.2 filed Jan. 12, 2021 and CN Patent Application No 202110845122.0 filed Jul. 26, 2021, the contents of all of the above are incorporated by reference herein.

BACKGROUND

Field

The present disclosure relates to the technical field of computer and artificial intelligence. Specifically, the present disclosure relates to processing a video to locate a target action or a target object in the video.

Description of Related Art

Temporal action localization is to detect the location and type of each action contained in a continuous long video that is not divided. In recent years, methods based on deep learning have made remarkable achievements in the field of computer vision. Deep neural networks have also achieved better results than traditional methods in the field of action localization, which has greatly promoted the development of the field of action localization.

SUMMARY

However, a conventional action localization method uses a large model and a large amount of calculation, so the memory capacity and computing power of the device are required to be high, thus resulting in a limited scope of application. Therefore, it is necessary to improve the conventional action localization method.

The present disclosure aims to solve at least one of the above-mentioned technical problems. The technical solution provided by one or more embodiments of the present disclosure.

According to an aspect of the disclosure, an action localization method may include: identifying at least one target video segment containing a target object in a video; acquiring a first action recognition result of at least one image frame in the at least one target video segment and a second action recognition result of the target video segment; and acquiring an action localization result of the video based on the first action recognition result and the second action recognition result.

The identifying the at least one target video segment may include: performing target object detection on the video, and acquiring the at least one target video segment based on a target object detection result of the performing the target object detection.

The identifying the at least one target video segment may include: acquiring at least one first image frame from the video, and performing target object detection on the at least one first image frame to obtain a target object detection result; based on the target object detection result indicating that a current first image frame acquired at current moment contains the target object, caching the current first image frame, a previous first image frame relative to the current moment, and an intermediate image frame between the current first image frame and the previous first image frame, and based on a total number of cached image frames at the current moment is not less than a first preset number, outputting the cached image frames at the current moment as the at least one target video segment; and based on the first target object detection result indicating that the current first image frame acquired at the current moment does not contain the target object, and based on the total number of cached image frames at the current moment is not less than a second preset number, outputting the cached image frames at the current moment as the at least one target video segment.

The action localization method may further include: after outputting the at least one target video segment, based on the target object detection result indicating that the current first image frame acquired at the current moment contains the target object, retaining a third preset number of the cached image frames before the current first image frame, and clearing other cached image frames; and after outputting the at least one target video segment, based on the target object detection result indicating that the current first image frame acquired at the current moment does not contain the target object, clearing the cached image frame at the current moment.

The acquiring the first action recognition result and the second action recognition result of the target video segment may include: acquiring at least one second image frame from the target video segment; performing action recognition on the at least one second image frame to obtain the first action recognition result; and based on the first action recognition result, acquiring the second action recognition result.

The performing the action recognition on the at least one second image frame may include: extracting spatial information corresponding to the at least one second image frame, and acquiring an input feature based on the spatial information; extracting temporal information corresponding to the at least one second image frame based on the input feature using at least one temporal residual neural network, and acquiring an output feature based on the input feature and the temporal information; and based on the output feature, acquiring the first action recognition result corresponding to the at least one second image frame.

The at least one temporal residual neural network may include a first branch and a second branch; and the extracting the temporal information corresponding to the at least one second image frame may include: using the first branch and based on the input feature, acquiring weight information corresponding to the at least one second image frame, and acquiring a first feature including a first temporal information based on the weight information and the input feature; using the second branch and based on the input feature, acquiring feature information of an adjacent second image frame that immediately precedes or immediately follows the at least one second image frame, and acquiring a second feature including a second temporal information based on the feature information of the adjacent second image frame; and based on the first feature and the second feature, acquiring the output feature.

The acquiring the second action recognition result may include: aggregating the first action recognition result of the at least one second image frame to obtain the second action recognition result.

The first action recognition result may include first probabilities that the at least one second image frame contains one or more preset action types, respectively; the second action recognition result may include second probabilities that the at least one target video segment contains the one or more preset action types, respectively; and the aggregating the first action recognition result may include: acquiring an average value of the first probabilities that respectively correspond to the one or more preset action types in the at least one second image frame; normalizing the average value of the first probabilities to obtain the second probabilities corresponding to the one or more preset action types, respectively; and acquiring the second probabilities as the second action recognition result.

The first probabilities may be non-normalized log probability Logits values.

The acquiring the action localization result of the video may include: based on the first action recognition result and the second action recognition result, acquiring the action localization result of the at least one target video segment; and based on the action localization result of the target video segment, acquiring the action localization result of the video.

The acquiring the action localization result of the at least one target video segment may include: determining at least one candidate proposal based on the first action recognition result and the second action recognition result; based on each of the at least one candidate proposal, recognizing an action interval in the target video segment, and determining a target candidate proposal; and obtaining an action type corresponding to the target candidate proposal and the action interval corresponding to the target candidate proposal as the action localization result of the at least one target video segment.

The determining at least one candidate proposal may include: based on the first action recognition result and the second action recognition result, determining a proposal threshold corresponding to at least one preset action type; and for each of the at least one preset action type, determining the at least one candidate proposal based on the proposal threshold and the first action recognition result.

The determining the at least one candidate proposal based on the proposal threshold and the first action recognition result may include: determining a probability that at least one candidate second image frame contains the at least one preset action type is greater than the proposal threshold; and based on the at least one candidate second image frame, determining the at least one candidate proposal.

The recognizing the action interval in the target video segment, and the determining the target candidate proposal may include: acquiring a first video segment feature corresponding to the target video segment; based on each of the at least one candidate proposal, determining a second video segment feature of the action interval; and determining the target candidate proposal based on the first video segment feature and the second video segment feature.

According to another aspect of the disclosure, an electronic device for processing video data may include: a memory storing one or more instructions; and at least one processor configured to execute the one or more instructions to: identify at least one target video segment containing a target object in a video; acquire a first action recognition result of at least one image frame in the at least one target video segment and a second action recognition result of the target video segment; and acquire an action localization result of the video based on the first action recognition result and the second action recognition result.

The at least one processor may be further configured to: acquire at least one first image frame from the video, and perform target object detection on the at least one first image frame to obtain a target object detection result; based on the target object detection result indicating that a current first image frame acquired at current moment contains the target object, cache the current first image frame, a previous first image frame relative to the current moment, and an intermediate image frame between the current first image frame and the previous first image frame; and based on a total number of cached image frames at the current moment is not less than a first preset number, outputting the cached image frames at the current moment as the at least one target video segment.

The at least one processor may be further configured to: after outputting the at least one target video segment, based on the target object detection result indicating that the current first image frame acquired at the current moment contains the target object, retain a preset number of the cached image frames before the current first image frame, and clear other cached image frames.

The at least one processor may be further configured to: acquire at least one second image frame from the target video segment; perform action recognition on the at least one second image frame to obtain the first action recognition result; and based on the first action recognition result, acquire the second action recognition result.

The at least one processor may be further configured to: extract spatial information corresponding to the at least one second image frame, and acquire an input feature based on the spatial information; extract temporal information corresponding to the at least one second image frame based on the input feature using at least one temporal residual neural network, and acquire an output feature based on the input feature and the temporal information; and based on the output feature, acquire the first action recognition result corresponding to the at least one second image frame.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11A is a schematic diagram of an action recognition result according to an embodiment;

DETAILED DESCRIPTION

Figure 1:
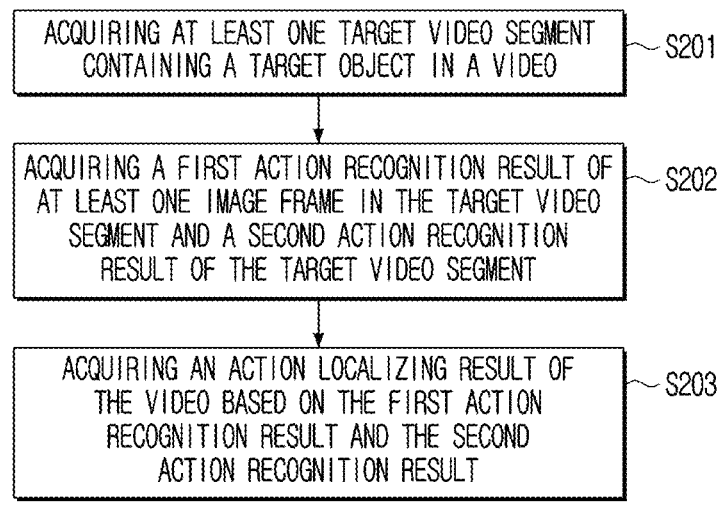
FIG. 1 is a schematic flowchart of an action localization method provided by an embodiment.

The embodiments of the present disclosure are described in detail below. Examples of the embodiments are shown in the accompanying drawings, wherein the same or similar reference numerals indicate the same or similar elements or elements with the same or similar functions. The embodiments described below with reference to the drawings are examples, and are only used to explain the present disclosure, and cannot be construed as a limitation to the present disclosure.

Those skilled in the art can understand that, unless specifically stated otherwise, the singular forms "a", "said" and "the" used herein may also include plural forms. It should be further understood that the term "comprising" used in the specification of the present disclosure refers to the presence of the described features, integers, steps, operations, elements and/or components, but does not exclude the presence or addition of one or more other features, Integers, steps, operations, elements, components, and/or combinations thereof. It should be understood that when we refer to an element as being "connected" or "coupled" to another element, it can be directly connected or coupled to the other element, or intervening elements may also be present. In addition, "connected" or "coupled" used herein may include wireless connection or wireless coupling. The term "and/or" as used herein includes all or any unit and all combinations of one or more associated listed items.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

Temporal action localization refers to for a given piece of undivided and continuous long video containing multiple actions, acquiring an action type of each action and a starting time point and an ending time point of each action.

Traditional action localization methods generally obtain the type of each action through action recognition, and then obtain the starting time point and ending time point of each action through temporal action proposal. For example, the action recognition method based on a Temporal Shift Module (TSM) and the temporal action proposal method based on a (Dense Boundary Generator (DBG) are adopted.

TSM is a dual stream basenet, which generally processes RGB images and optical flow images. First, according to the RGB image, the optical flow sequence is extracted through a certain algorithm, and then the image and optical flow are processed separately as two sub-branches of the network, and finally the results are aggregated to a certain extent. TSM makes it possible to obtain a certain degree of time dimension information when only RGB images are used for convolution calculations. Using this module, it is possible to abandon the optical flow part in some scenarios to increase the calculation speed and obtain better real-time performance. The feature shape output by each layer in the image convolutional neural network is generally (n, h, w, c), where, n is the number of pictures in a batch, h is the height of the feature, w is the width of the feature, and c is the number of channels of the feature. In the problem of video action recognition, the shape is generally (n*t, h, w, c), where t is the number of images selected in a video. Take n=1 as an example, change the shape and simplify it to (t, h*w, c). Select a certain number of channels, and move the data of this channel forward in the time dimension; and select the same number of channels, and move the data of this channel backward in the time dimension. Then restore the dimension of the feature, and perform the convolution operation that originally needed to be performed. Because the feature is shifted in the time dimension, time dimension information is obtained from the original convolutional network.

The DBG method first uses the action recognition network to extract spatial and temporal features using RGB images and optical flow images, and then obtains the action score features and dual stream features through a Dual Stream BaseNet (DSB network). Here, the action score feature obtains the action confidence table through an Action-aware Completeness Regression (ACR) network, and the dual stream feature obtains the starting time confidence table and the ending time confidence table through a Temporal Boundary Classification (TBC) network. Combine the three tables to obtain the interval of alternative actions, and finally filter out the repeated intervals through a Soft Non-Maximum Suppression (Soft NMS) method to obtain the final action interval. The AR@50 data of this method on THUMOS14 is 40.89, the index is still low, and it is difficult to apply it to actual products. Here, the meaning of AR@50 is: AR refers to the average recall, 50 represents the average number of proposals for each video, and the overall meaning of AR@50 data being 40.89 is: given 50 candidate intervals in a video, 40.89% of the correct intervals can be found among all the correct intervals.

In summary, the following problems exist in the above-mentioned action localization method:

(1) in the task of action recognition, the TSM method based on 2D convolution obtains temporal information through time shifting. The information thus obtained is limited, because the temporal information obtained by TSM can only indicate the changes between different frames. It cannot express the meaning of these changes. However, temporal semantic information refers to a deeper time dimension information that can express the specific semantics contained in the changes between different image frames, such as the "dancing". TSM ignores the impact of temporal semantic information on action recognition and localization, but temporal semantic information is very important for video. The lack of temporal semantic information may lead to incorrect action localization results. For example, the action type of a certain video is dancing, and the action type of the first (image) frame is dancing, and the third (image) frame does not have obvious features for the action type of dancing. From the third (image) frame, the action is more similar to walking. If the temporal semantic information can be extracted at this time, the temporal semantic information can focus on the action state of the entire video, and accordingly, based on temporal semantic information, it can accurately recognize and localize actions;

(2) in the temporal action proposal task, the average recall rate of the DBG method is low, and it is difficult to apply it to actual products; and (3) the current action recognition methods and temporal action proposal methods both need to use optical flow data, which makes it necessary to extract optical flow when processing video, thus resulting in low operation speed and difficulty in ensuring real-time performance.

In view of the foregoing problems, the embodiments of the present disclosure provide an action localization method, which will be described in detail below.

FIG. 1 is a schematic flowchart of an action localization method provided by an embodiment. As shown in FIG. 1, the method may include:

Step S201: acquiring at least one target video segment that contains a target object in a video.

Here, the target object is a subject who takes the action in the action localization task, which can be a person, an animal or other objects that can move. In the embodiments of the present disclosure, the method provided in the present disclosure is mainly described by localizing the human action, but the present disclosure is not limited to this. It is understandable that the target object contained in a video segment may be one or more, for example, pedestrian A and/or pedestrian B.

Here, the target video segment is a video segment that contains the target object in the video. Action localization on a video is an operation of locating an action in these target video segments in the video, and then obtain the localization result of the entire video according to the action localization results of these target video segments. Therefore, it may be necessary to first filter out these target video segments containing the target object from the video that needs to be localized.

Step S202: acquiring a first action recognition result of at least one image frame in the target video segment and a second action recognition result of the target video segment.

Here, the target video segment contains multiple image frames. During the action recognition process, each image frame may have a corresponding action recognition result, that is, the first action recognition result. At the same time, during the action recognition process, each target video segment can have a corresponding action recognition result, that is, the second action recognition result. A video segment may refer to a fragment of video information that is a collection of video frames. A video segment may be formed with a disjoint set of consecutive frames that are homogeneous according to some defined criteria.

Specifically, the action recognition results of some image frames in the target video segment are obtained respectively, that is, multiple first action recognition results are obtained, and the second recognition result of the target video segment is obtained based on the multiple first action recognition results.

Step S203: acquiring an action localization result of the video based on the first action recognition result and the second action recognition result.

Specifically, for each target video segment in the video, the action localization result may be obtained according to multiple first action recognition results (e.g., action recognition results of video frames) corresponding to multiple image frames and its own second action recognition result (e.g., an action recognition result of a target video segment). Then, based on the action localization results of multiple target video segments in the video, the action localization result of the entire video is obtained.

In an embodiment of the present disclosure, after acquiring the target video segments containing the target object in the video to be localized, the first action recognition results of the multiple image frames in each target video segment and the second action recognition results of the respective target video segments are acquired, and then based on each of the first action recognition results and the second action recognition results, the action localization result of the video to be localized is obtained. According to the embodiment, it may not be required to obtain optical flow images during the process of action localization, and therefore the embodiment may provide technical benefits of small memory capacity, small calculation amount, high accuracy and wider scope of application.

Figure 2:
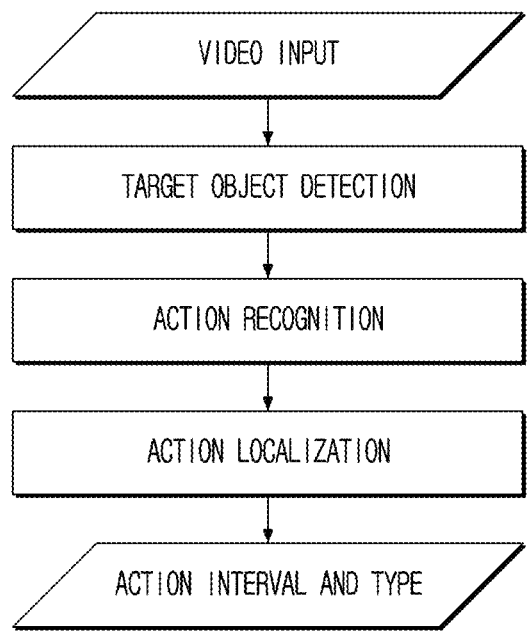
FIG. 2 is a schematic flowchart of an action localization method in an example of an embodiment.
Figure 3A:
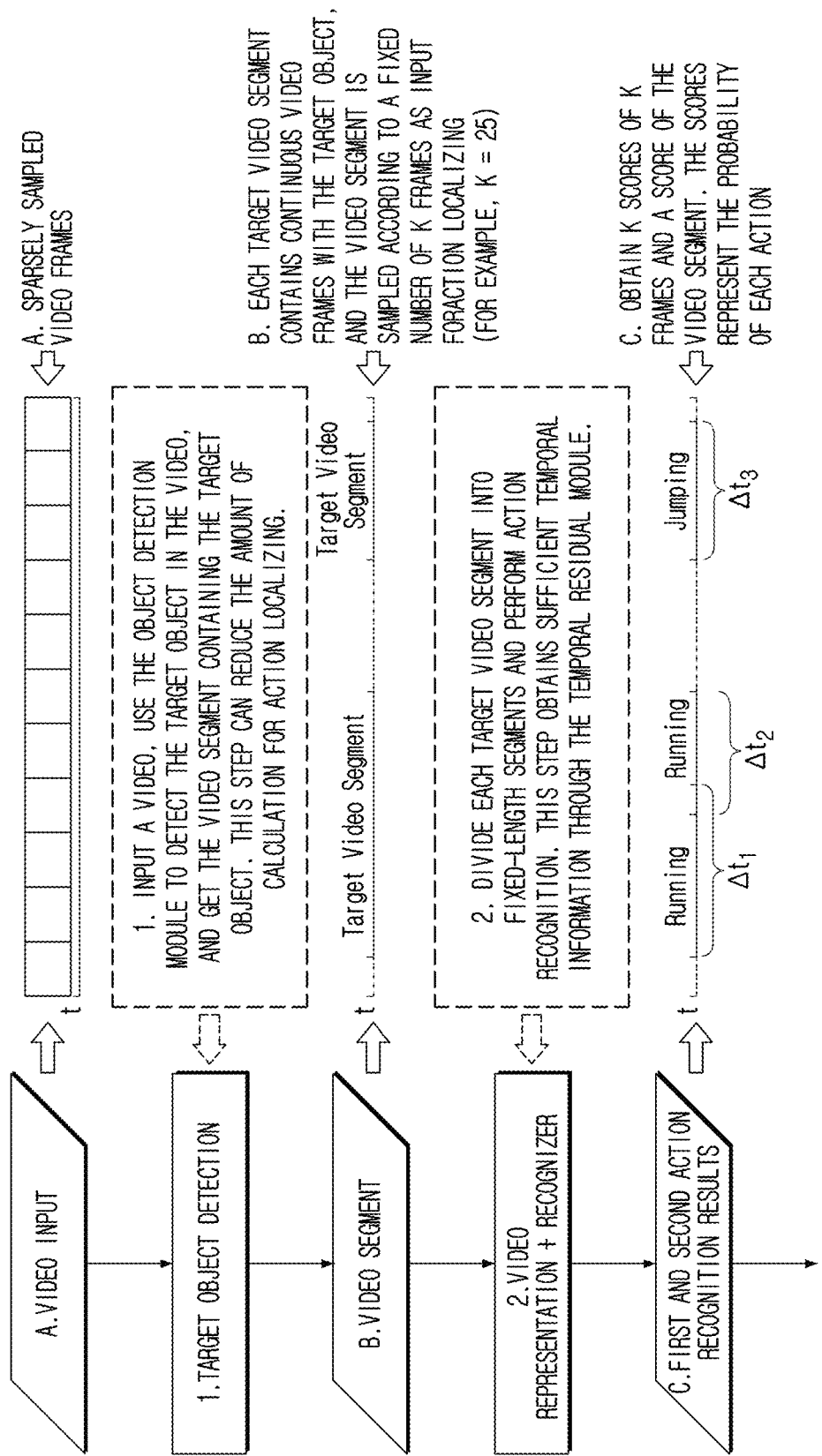
FIG. 3A is a schematic diagram of an action localization process of an inputted video according to an embodiment.

As shown in FIG. 2, the specific implementation process of the action localization method provided by the present disclosure mainly includes the following tasks: target object detection, action recognition, and action localization. Specifically, as shown in FIG. 3A, the task of action recognition can include the steps of Video Representation+recognizer, and the task of action localization can include the steps of Temporal Action Proposal+recognizer and aggregating. The action localization method provided by the present disclosure specifically includes:

1. Target Object Detection:
   (1) Input a piece of video to be positioned (in FIG. 3A, a sparsely sampled video frame is taken as an example), and the video contains at least one frame of RGB image.
   (2) Use an object detection module (such as a pedestrian detection module) to perform target object detection on the video. If the target object is a pedestrian, the time interval with a pedestrian is selected as a candidate interval for action recognition. This step is the target object detection, which is used as the basis for determining the target video segment. This step can avoid performing action localization on all video content, and only perform action localization on the video segment containing the target object, so that the amount of calculation for action localization may be reduced.

(3) Divide the interval with the target object (such as a pedestrian) into video segments every t seconds, and take a segment with a duration of less than t seconds as a video segment according to the actual length of time. In other words, select video segments containing a target object (such as a pedestrian) in the video as the target video segments.

Here, two adjacent video segments may have overlapping frames, that is, previous frames of a current video segment may be the same as last frames of a previous adjacent video segment. Last frames of the current video segment may be the same as previous frames of a next adjacent video segment to ensure the recognition and localization effect of the image frames at the boundary. Specifically, the number of overlapping frames may be set according to actual conditions, and is not limited here.

(4) For each target video segment, extract k image frames, and if there are less than k images, copy the last image frame to make sure there are k image frames. It should be noted that these copied image frames need to be eliminated in the subsequent action localization stage.

The above steps can also be understood as: in the interval with the target object (such as a pedestrian), sample according to a fixed number of frames, and use the obtained video segment as the target video segment for action localization. Here, the above-mentioned fixed number of frames may be k (for example, k=25).

Through the above-mentioned target object detection steps, several target video segments may be obtained, and each target video segment contains continuous video frames (also called image frames) with target objects (such as pedestrians).

2. Video Representation and Recognizer

Input k image frames of a target video segment into an action recognition network containing a temporal residual module to perform action recognition, and obtain a first action recognition result of each image frame in the k image frames, and a second action recognition result of the target video segment, for example, obtain k scores of k respective frames and a score of the video segment. Each score represents the probability of each action. The temporal residual module may be implemented as at least one neural network including one or more layers. For example, perform action recognition on the target video segments $^At_2$ and $^At_3$, the action recognition results of $^At_1$ and $^At_2$ may have the highest probability of running, and the second action recognition result of $^At_3$ may have the highest probability of jumping.

The above steps may also be understood as: divide each target video segment into fixed-length segments, and perform action recognition to obtain a corresponding first action recognition result and second action recognition result. In this step, sufficient temporal semantic information may be obtained through the temporal residual module (TRM).

3. Temporal Action Proposal and Recognizer

Figure 3B:
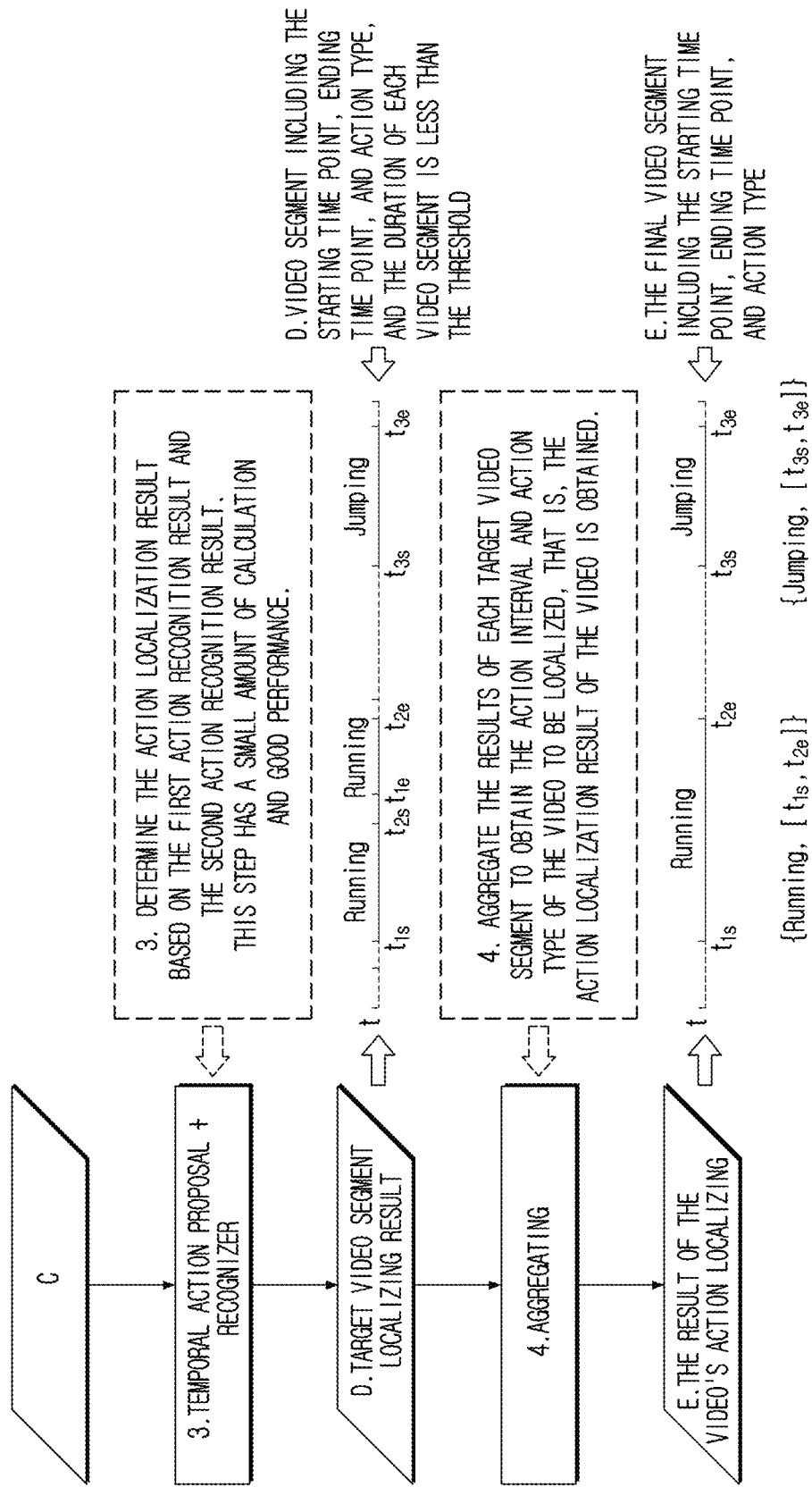
FIG. 3B is a schematic diagram of an action localization process of an inputted video according to an embodiment.

Referring to FIG. 3B, according to the first action recognition result of each image frame in the k image frames, and the second action recognition result of the target video segment, through adaptive multi-scale localization method or time pyramid method, determine whether there is an action in the target video segment, as well as the action interval and action type of the action, that is, obtain the action localization result of the target video segment. Then, for the input video, through this step, each video segment including the starting time point, ending time point and action type may be obtained (the duration of each video segment is less than a threshold). For example, three video segments are obtained, which are: the starting time point is tis, the ending time point is $t_{1e}$, and the action type is running; the starting time point is $t_{2s}$, the ending time point is $t_{2e}$, and the action type is running; and, the starting time point is tis, the ending time point is $t_{3e}$, and the action type is jumping. The amount of calculation in this step is small and the performance is good.

4. Aggregating

The results of each target video segment are aggregated to obtain the action interval and action type of the video to be localized, that is, the action localization result of the video is obtained. That is, a final video segment containing the starting time point, the ending time point and the action type is obtained. For example, by aggregating the three video segments in the above example, the result of the video's action localization may be obtained: the action type between $t_{1s}$ and $t_{2e}$ of the video is running, and the action type between $t_{3s}$ and $t_{3e}$ of the video is jumping.

The target object detection, action recognition, and action localization in the above steps will be further explained below.

In an embodiment of the present disclosure, acquiring at least one target video segment containing a target object in a video includes:

performing target object detection on at least one image frame in the video, and acquiring at least one target video segment based on the target object detection result.

Specifically, target object detection is performed on multiple image frames in the video to be localized, and according to the detection result, it is determined which video segments contain the target objects, and these video segments are determined as target video segments.

In an embodiment of the present disclosure, performing target object detection on at least one image frame in the video and acquiring at least one target video segment based on the target object detection result includes:

acquiring at least one first image frame from the video, and performing target object detection on the acquired first image frame to obtain a corresponding target object detection result;

if the target object detection result indicates a current first image frame acquired at current moment contains a target object, caching the current first image frame, a previous first image frame relative to the current moment, and an image frame between the current first image frame and the previous first image frame, and if the total number of cached image frames at the current moment is not less than a first preset number, the cached image frames at the current moment are output as a corresponding target video segment; and if the target object detection result indicates that the current first image frame acquired at the current moment does not contain a target object, and if the total number of cached image frames at the current moment is not less than a second preset number, outputting the cached image frames at the current moment as a corresponding target video segment.

It is understandable that when performing target object detection on the video to be localized, target object detection may be performed on all image frames in the video, and then the target video segment may be determined according to the detection result of the target object. Then, in order to reduce the detection times of the target object and improve the calculation efficiency, instead of comprehensively detecting the image frames in the video, part of the image frames (first image frames) may be extracted for target object detection. For example, first image frames may be obtained from the video every first preset duration. In other words, samples are taken from the video at equal time intervals (that is, the first preset duration) to obtain image frames for target object detection (that is, the first image frames). Here, the first preset duration may be set according to actual needs, for example, it may be set to 1 s. It is also possible to randomly obtain multiple first image frames from the video, in other words, sample from the video at non-equal time intervals to obtain the first image frames for target object detection. Here, the interval length of the sampling process may be set according to actual needs. After sampling, target object detection is performed on the acquired first image frames, where moment at which each sampling is performed may be called a sampling moment. Since the action of the target object may last for a certain period of time, multiple consecutive image frames will contain the target object. Therefore, it is possible to predict whether adjacent image frames contain the target object according to the target detection result of an image frame.

Specifically, target object detection is performed on a current image frame acquired at the current moment (or called the current sampling moment). If the target object detection result is that the current image frame contains a target object, it is considered that the current first image frame corresponding to the current moment, a previous first image frame corresponding to a previous sampling moment and an image frame between the two sampling moments all contain the target object, then these image frames are cached. Then, it is further determined whether the total number of the cached image frames at the current moment is greater than or equal to a first preset value (that is, it is determined whether the duration of a video segment formed by the cached image frames at the current moment is greater than or equal to a certain preset duration). If it is greater than or equal to the first preset value, the cached image frames at the current moment are output as a corresponding target video segment; and if it is less than the first preset value, target object detection and determination of the number of the cached image frames corresponding to a next sampling moment is performed. At the same time, in this case, after outputting the corresponding target video segment, the cached image frames other than the cached image frames with a third preset value before the current first image frame are cleared. The cached image frames with the third preset value are reserved for the purpose of allowing two adjacent target video segments to have overlapping parts, thereby reducing the influence that the localization error of the subsequent action may have on the aggregating of the target action intervals.

If the target object detection is performed on the current image frame acquired at the current moment, and the target object detection result is that the current image frame does not contain the target object, then it is considered that neither of the current first image frame corresponding to the current moment, the previous first image frame corresponding to the previous sampling moment, and the image frame between the two sampling moments contains the target object. Then, it is further determined whether the total number of cached image frames at the current moment is greater than or equal to a second preset value, and if it is greater than or equal to the second preset value, the cached image frames at the current moment are output as a corresponding target video segment; and if it is less than the second preset value, continue to perform detection of the target object corresponding to a next sampling moment and determine the number of cached image frames. It is understandable that the second preset value may be set to 0. That is, in this case, if there are cached image frames at the current moment, the cached image frames at the current moment are output as the target video segment, and if there is no cached image frame at the current moment, the target object detection and determination of the number of cached image frames corresponding to a next sampling moment is performed. At the same time, in this case, after outputting the corresponding target video segment, the cached image frames at the current moment are cleared.

Figure 4:
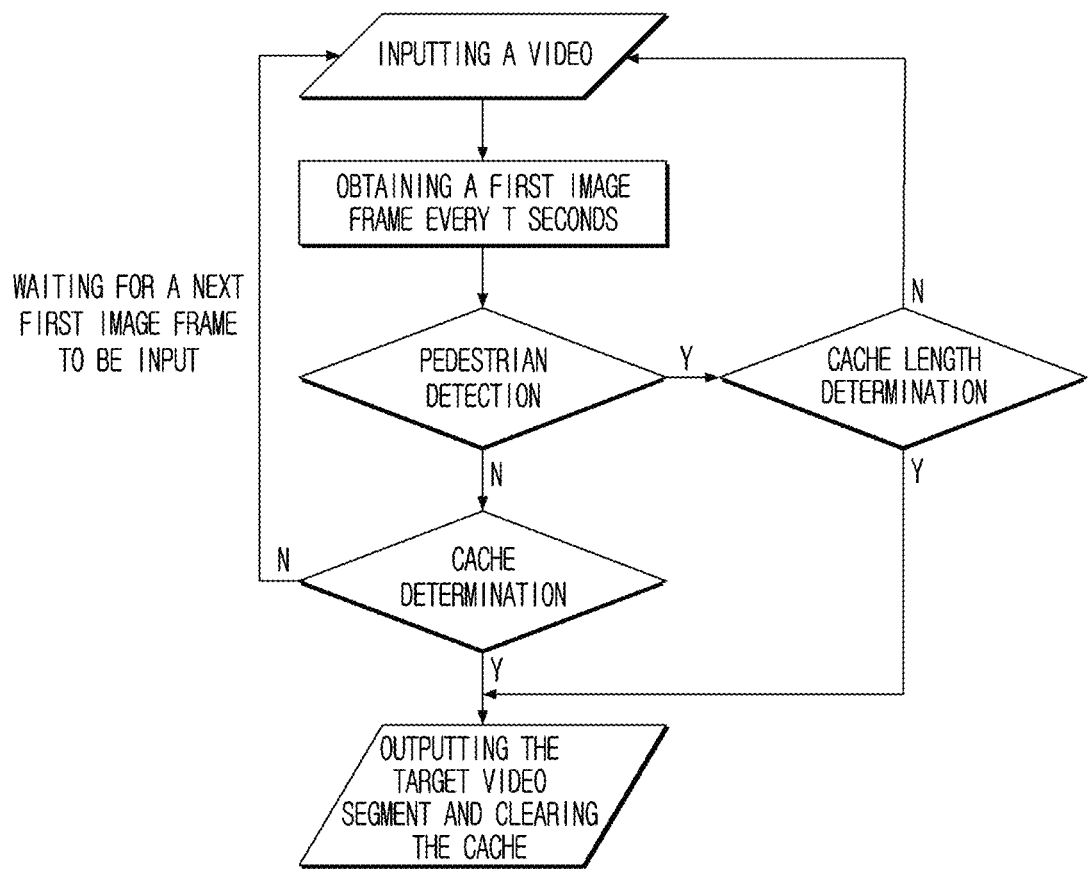
FIG. 4 is a schematic flowchart of a pedestrian detection process in an example of an embodiment.

The following takes a pedestrian as a target object to illustrate the above process. As shown in FIG. 4, it may include the following steps:

(1) decoding a video to be localized, sampling it every t seconds (that is, a first preset duration, an optional value is t=1) in chronological order, acquiring a first image frame, and inputting a preprocessed first image frame to a pedestrian detection module;

(2) performing pedestrian detection on the video, that is, detecting whether the first image frame contains a pedestrian; and an available pedestrian detection method is SSD (Single Shot MultiBox Detector);

(3) determining whether the first image frame at the current moment contains a pedestrian, if it contains a pedestrian, caching all RGB images between second (the previous image acquisition moment) to $t_1$ seconds (the current moment or the current image acquisition moment);

(4) further determining whether the length of the cached image frames at the current moment reaches $t_n$ seconds (an optional value is $t_n$=8), if yes, outputting the cached image frames at the current moment as the target video segment, and clearing the remaining cached image frames except the last 1 s, and if not, waiting for pedestrian detection in a next first image frame. The foregoing determination of whether the length of the cached image frames at the current moment reaches $t_n$ seconds may be referred to as a cache length determination; and (5) if the first image frame at the current moment does not contain a pedestrian, determining whether there are cached image frames at the current moment, if there are cached image frames, outputting the cached image frames at the current moment as the target video segment and clearing the cached image frames, and if there is no cached image frame, waiting for pedestrian detection in a next first image frame; the foregoing determination of whether there are cached image frames at the current moment may be referred to as a cache determination.

It should be noted that in the above steps (4) and (5), after the target video segment is output, the processing of the cached image frames may be collectively referred to as cache clearing.

In an embodiment of the present disclosure, acquiring a first action recognition result of at least one image frame in the target video segment and a second action recognition result of the target video segment includes:

acquiring at least one second image frame from the target video segment, and performing action recognition on the acquired at least one second image frame to obtain a corresponding first action recognition result; and based on the first action recognition result, acquiring a second action recognition result.

Specifically, for each target video segment, similar to the target object detection process, the calculation efficiency is improved by extracting part of the image frames (that is, the second image frames). For example, the target video segment may be sampled at equal time intervals to obtain multiple second image frames. That is, every preset duration, the second image frames are obtained from the target video segment; and it is also possible to sample the target video segment at unequal time intervals to obtain multiple second image frames. Here, both the second preset duration sampling and unequal time interval sampling may be set according to actual requirements. After acquiring the first action recognition result of each second image frame, according to the multiple first action recognition results, a second action recognition result of the target video segment may be obtained.

Figure 5:
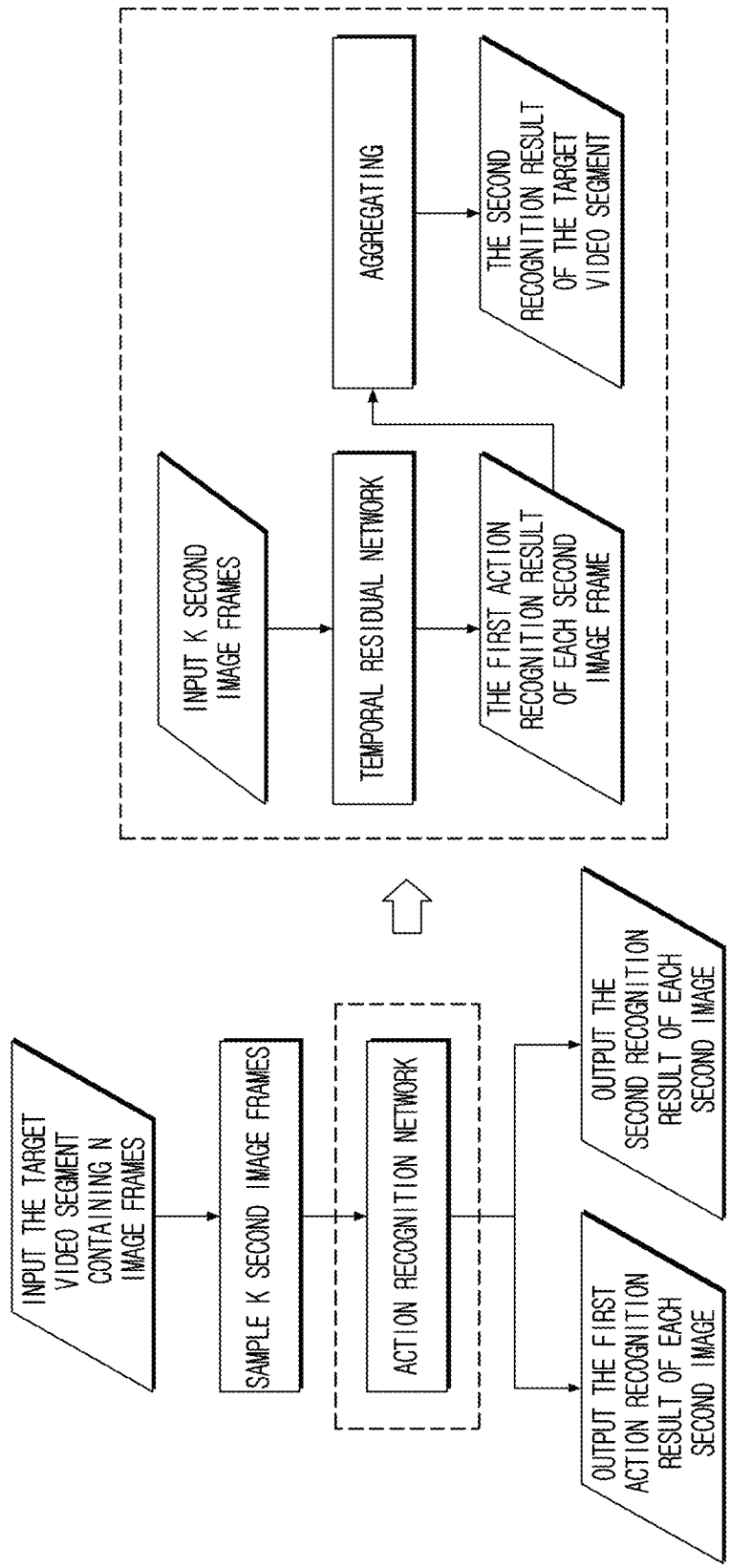
FIG. 5 is a schematic flowchart of an action recognition process in an example of an embodiment.

For example, as shown in FIG. 5, the specific process of the above action recognition may include the following steps:
(1) each target video segment containing n image frames, and n is at least 1;
(2) sampling k second image frames at equal time intervals (i.e., the second preset duration), the value of k being determined by the input size of the action recognition network (i.e., the temporal residual network), an optional k value is 25. If k>n, the last image frame in the target video segment is copied until the number of sampled frames reaches k frames, and the number of copied pictures x is recorded at the same time;
(3) inputting k second image frames into the action recognition network, and acquiring a first action recognition result of each second image frame, specifically, k preprocessed second image frames are input, the size of which is (k, h, w, c), where k is the number of second image frames, and his the height of the second image frames, W is the width of the second image frame, and c is the number of channels of RGB images, for example, c=3, the first action recognition result of each second image frame may be obtained through the temporal residual network, here, the size of the first action recognition result is (k, m+1), where k is the number of second image frames, and m+1 is the number of action types, that is, it contains m preset action types and 1 other action type (other action type can be unrecognized action type or actionless (that is, no action)); and
(4) aggregating the first action recognition results of the respective second image frames to obtain the second action recognition result of the corresponding target video segment, here, the second action recognition result is a one-dimensional vector with a length of m+1.

In an embodiment of the present disclosure, performing action recognition on the acquired at least one second image frame to obtain a corresponding first action recognition result includes:
extracting spatial information corresponding to the at least one second image frame, and acquiring a corresponding input feature based on the spatial information;
extracting temporal information corresponding to the at least one second image frame based on the input feature using at least one temporal residual module, and acquiring a corresponding output feature based on the input feature and the temporal information; and
based on the output feature, acquiring the first action recognition result corresponding to the at least one second image frame.

Specifically, the acquired multiple second image frames may be input into a pre-trained temporal residual network, and the temporal residual network may extract spatial information corresponding to the multiple second image frames. The temporal residual network includes a temporal residual module, and the input feature containing the above spatial information is input into the temporal residual module. The temporal residual module may extract a first temporal information and a second temporal information of the second image frame, and may further obtain a first feature containing the first temporal information and a second feature containing the second temporal information. Finally, the temporal residual module obtains the corresponding output feature based on the first feature and the second feature. Then, the temporal residual network outputs the first action recognition results corresponding to respective second image frames based on the output feature.

Figure 6:
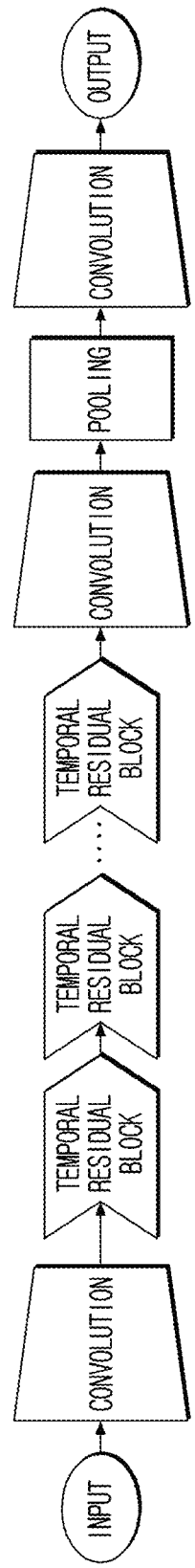
FIG. 6 is a schematic structural diagram of a temporal residual network in an example of an embodiment.

For example, a temporal residual network structure is shown in FIG. 6, which includes a backbone network and a temporal residual block (Temporal Residual Block, TRblock). Specifically, the skeleton network may use Mobilenet v2, and the structural details of the corresponding temporal residual network are shown in table 1, where t is the expansion ratio of the temporal residual block, c is the number of channels of the output feature, n is the number of temporal residual blocks, and s is the stride value of a first temporal residual block.

TABLE 1

| Size of the input feature | Module | t | c | n | s |
|---|---|---|---|---|---|
| $224^2 \times 3$ | Two-dimensional convolution | — | 32 | 1 | 2 |
| $112^2 \times 32$ | Temporal residual block | 1 | 16 | 1 | 1 |
| $112^2 \times 16$ | Temporal residual block | 6 | 24 | 2 | 2 |
| $56^2 \times 24$ | Temporal residual block | 6 | 32 | 3 | 2 |
| $28^2 \times 32$ | Temporal residual block | 6 | 64 | 4 | 2 |
| $14^2 \times 64$ | Temporal residual block | 6 | 96 | 3 | 1 |
| $14^2 \times 96$ | Temporal residual block | 6 | 160 | 3 | 2 |
| $7^2 \times 160$ | Temporal residual block | 6 | 320 | 1 | 1 |
| $7^2 \times 320$ | Two-dimensional convolution $1 \times 1$ | — | 1280 | 1 | 1 |
| $7^2 \times 1280$ | Average pooling $7 \times 7$ | — | — | 1 | — |
| $1 \times 1 \times 1280$ | Two-dimensional convolution $1 \times 1$ | — | m + 1 | — | — |

Figure 7:
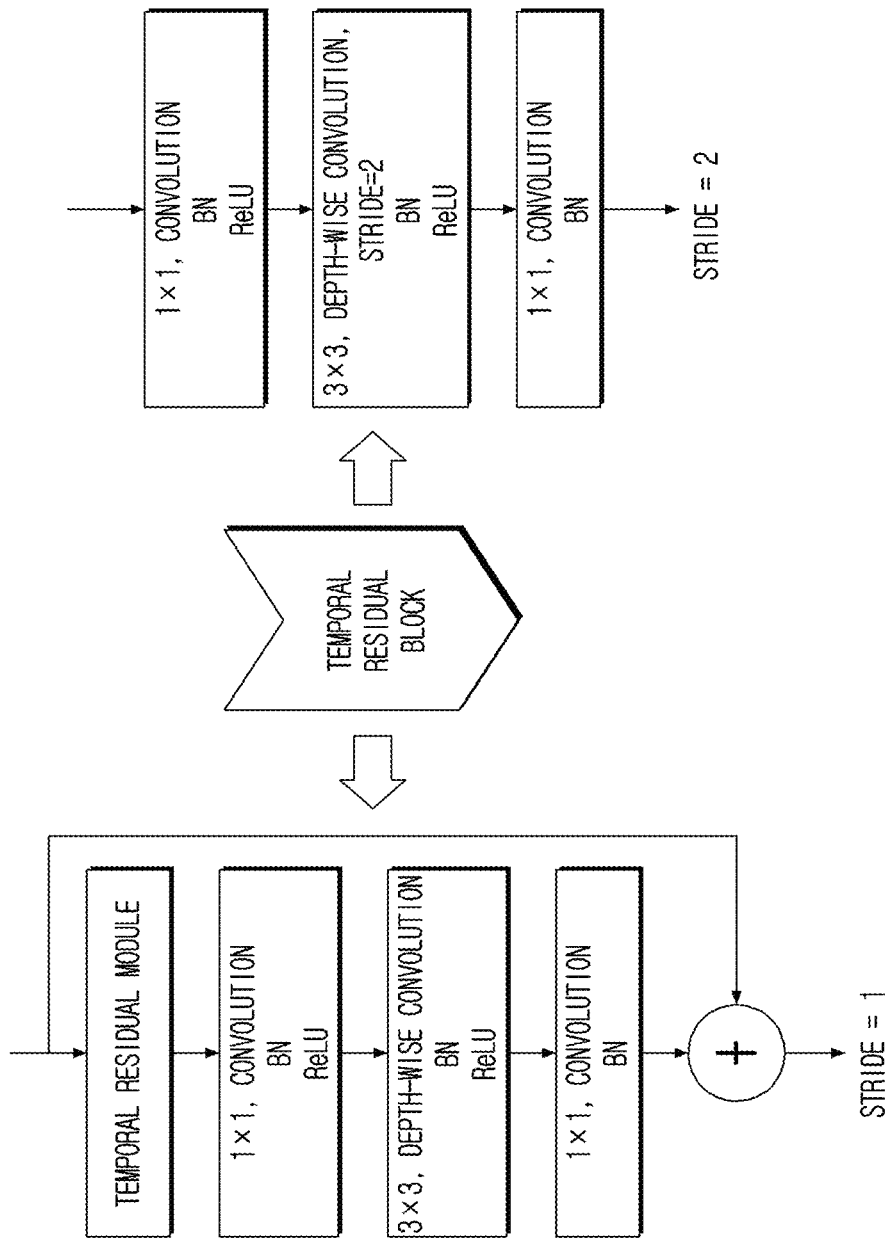
FIG. 7 is a schematic structural diagram of a temporal residual block in an example of an embodiment.

Here, the structure of the temporal residual block is shown in FIG. 7. If the shape of the input feature of a temporal residual block is the same as the shape of the output feature, that is, its stride=1, then in the temporal residual block, a temporal residual module (TRM) is added, which may be called a first-type temporal residual block. The shape of the input feature of the temporal residual block is different from the shape of the output feature, that is, when its stride=2, TRM is not added to the temporal residual block, which may be called a second type of temporal residual block. Specifically, the second type of temporal residual block may be used to extract spatial information of multiple second image frames and output a feature containing spatial information. The feature containing spatial information output from the second type of temporal residual block is taken as the input feature of the first type of temporal residual block. The TRM in the first type of temporal residual block further extracts the temporal information of multiple second image frames based on the spatial information in the input feature, and then outputs the output feature containing the spatial information and the temporal information. It should be noted that it may also be seen from table 1: that the first type of temporal residual block may take the output feature including spatial information output by the second type of residual block as the input feature, or take the output feature containing spatial information output by an ordinary convolutional layer as the input feature.

Specifically, referring to FIG. 7 again, first the corresponding output feature containing the first temporal information and the second temporal information is extracted from the initial input feature of the first type of temporal residual block with the help of the temporal residual module. Then with the help of a 1×1 convolution kernel, a 3×3 depthwise convolution kernel and a 1×1 convolution kernel, corresponding spatial information is extracted from the output feature. Then, the output feature output at this time contains not only the temporal information extracted by the temporal residual module, but also the spatial information extracted by the subsequent convolution. Then, the output feature containing the temporal information and the spatial information is aggregated with the initial input feature to obtain a final output feature of the first type of temporal residual module. Corresponding spatial information is extract from the initial input feature of the second type of temporal residual block with the help of a 1×1 convolution kernel, a 3×3 depthwise convolution kernel (with a stride of 2), and a 1×1 convolution kernel in turn, and the final output feature that only contains the corresponding spatial information is output.

In an embodiment of the present disclosure, the temporal residual module includes two parallel branches, and extracting temporal information corresponding to the at least one second image frame based on the input feature using at least one temporal residual module, and acquiring a corresponding output feature based on the input feature and the temporal information, includes:

using a first branch and based on the input feature, acquiring an attention information corresponding to the second image frame, and then acquiring the corresponding first feature containing the first temporal information based on the attention information and the input feature;

using a second branch and based on the input feature, acquiring feature information of an adjacent second image frame corresponding to the second image frame, and acquiring a corresponding second feature including a second temporal information based on the feature information of the adjacent second image frame; and acquiring a corresponding output feature based on the first feature and the second feature.

Specifically, the temporal residual module contains two branches. The first branch may also be called a global branch, and the second branch may also be called a local branch. These two branches may be set in parallel or serially with the purpose of acquiring more complex temporal semantic information.

Here, the global branch may use an attention sub-network, and through the pooling operation, the feature of each second image frame is regarded as a whole, and the importance of the feature corresponding to each second image frame may be considered from the global perspective. Through the attention sub-network, key semantic features and background features may be collected at the same time.

Figure 8A:
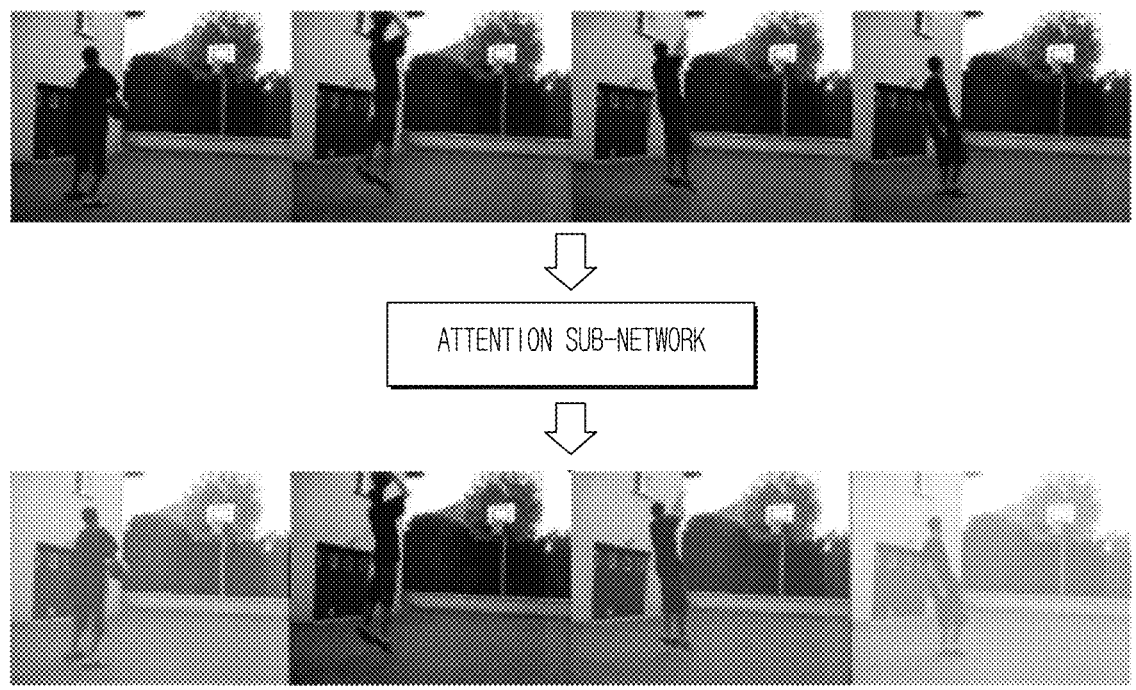
FIG. 8A is a schematic diagram of a global branching effect in an example of an embodiment.

The model will know which frame is more effective for action recognition, and other frames with non-obvious features will be weakened. The intuitive effect it produced is shown in FIG. 8A. Through the network, the importance of each frame is obtained, and the effect on the original image is that the attention degree of each frame has changed. For example, in FIG. 8A, a second (image) frame from the left has a higher importance, and therefore it has a higher degree of attention, a fourth (image) frame has the lowest importance, so it has a lower degree of attention, and it also applies to other (image) frames.

Figure 8B:
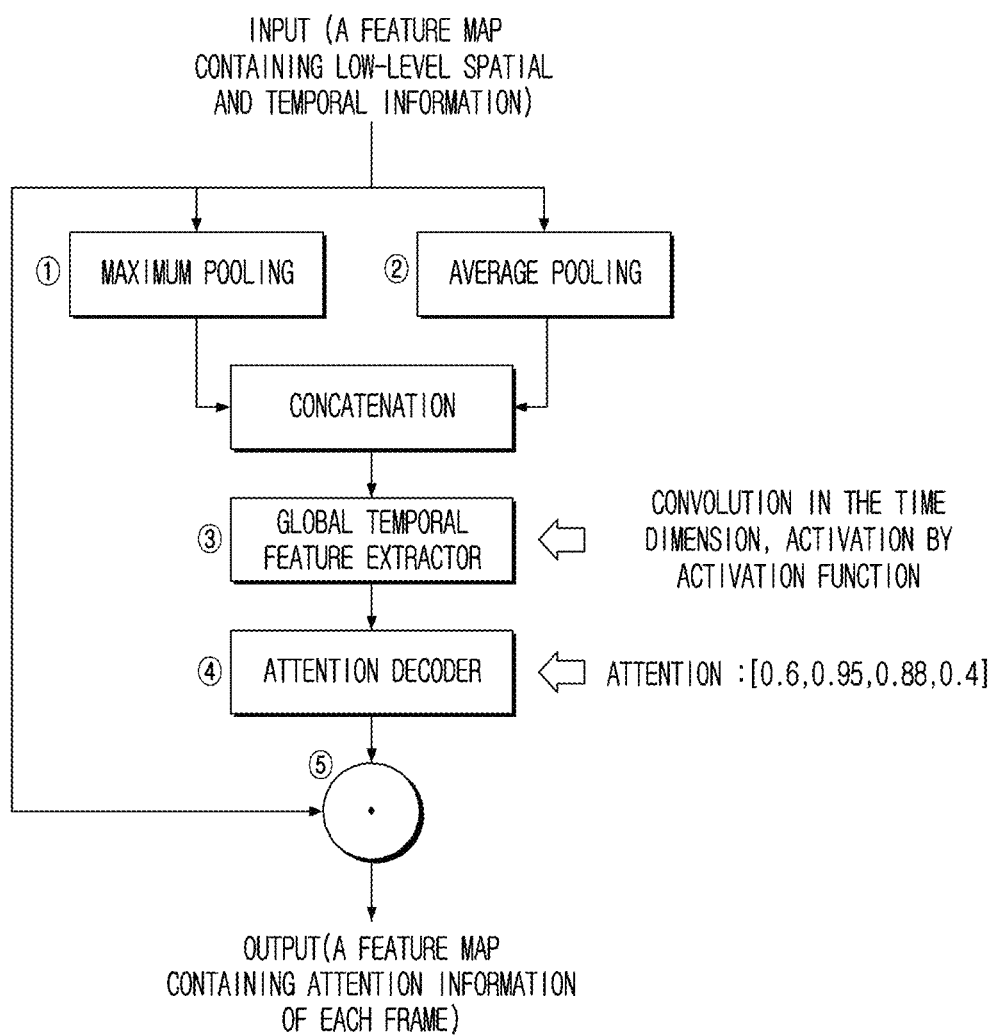
FIG. 8B is a schematic diagram of an attention sub-network in an example of an embodiment.
Figure 8C:
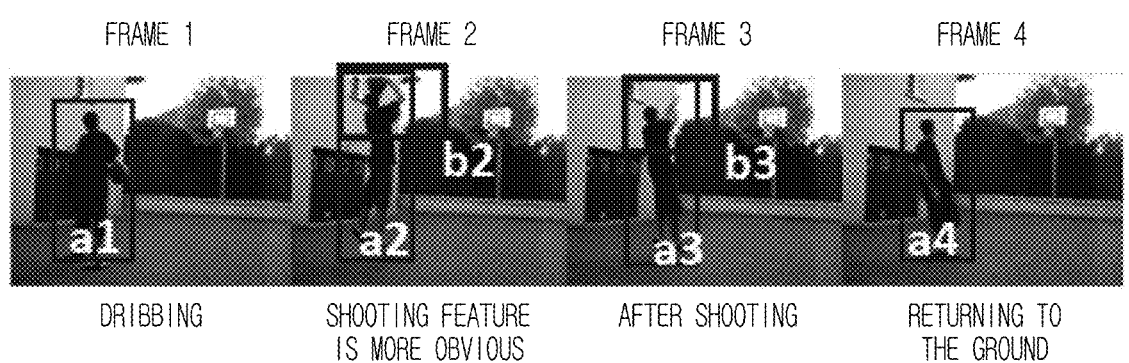
FIG. 8C is a schematic diagram of a basketball playing action in an example of an embodiment.

Specifically, an example of the attention sub-network is shown in FIG. 8B. Take a feature map containing low-level spatial and temporal information as input, and first perform maximum pooling and average pooling. Here, the maximum pooling may obtain key semantic information for action recognition. For example, in FIG. 8C, frames 1 to 4 are dribbling, shooting, after shooting and returning to the ground, respectively. The content in a window of each frame is a key semantic feature that helps in recognition. Window a1 is the key semantic feature of frame 1. Window a2 in frame 2 is the person shooting the ball, so the basket in window b2 has better semantic features. Window a3 in frame 3 is similar to window b3. Window a4 in frame 4 is only the person who shoots the ball, and the semantic feature is weak. Average pooling may preserve global information. For example, not every frame is as important for action recognition. The background information of some frames helps action recognition. For example, the basket as background information helps to recognize the action of playing basketball. That is, the basket in the background in FIG. 8C is important information for recognizing basketball playing. After concatenating the results of maximum pooling and average pooling, they are input into a global temporal feature extractor. The global temporal feature extractor extracts in a richer feature space temporal information using one-dimensional convolution, and activates it with an activation function, and in this way, the semantic information of each frame may be obtained in the global perspective with less calculation. Then, an attention decoder is used to calculate the importance of each frame according to the temporal information, and its value is 0 to 1. For example, the value of each frame in FIG. 8C is 0.6, 0.95, 0.88, and 0.4 respectively. The importance of each frame is aggregated into the feature map, that is, the importance value of each frame is multiplied by the corresponding feature map, and the feature map containing the attention information of each frame may be output.

Figure 8D:
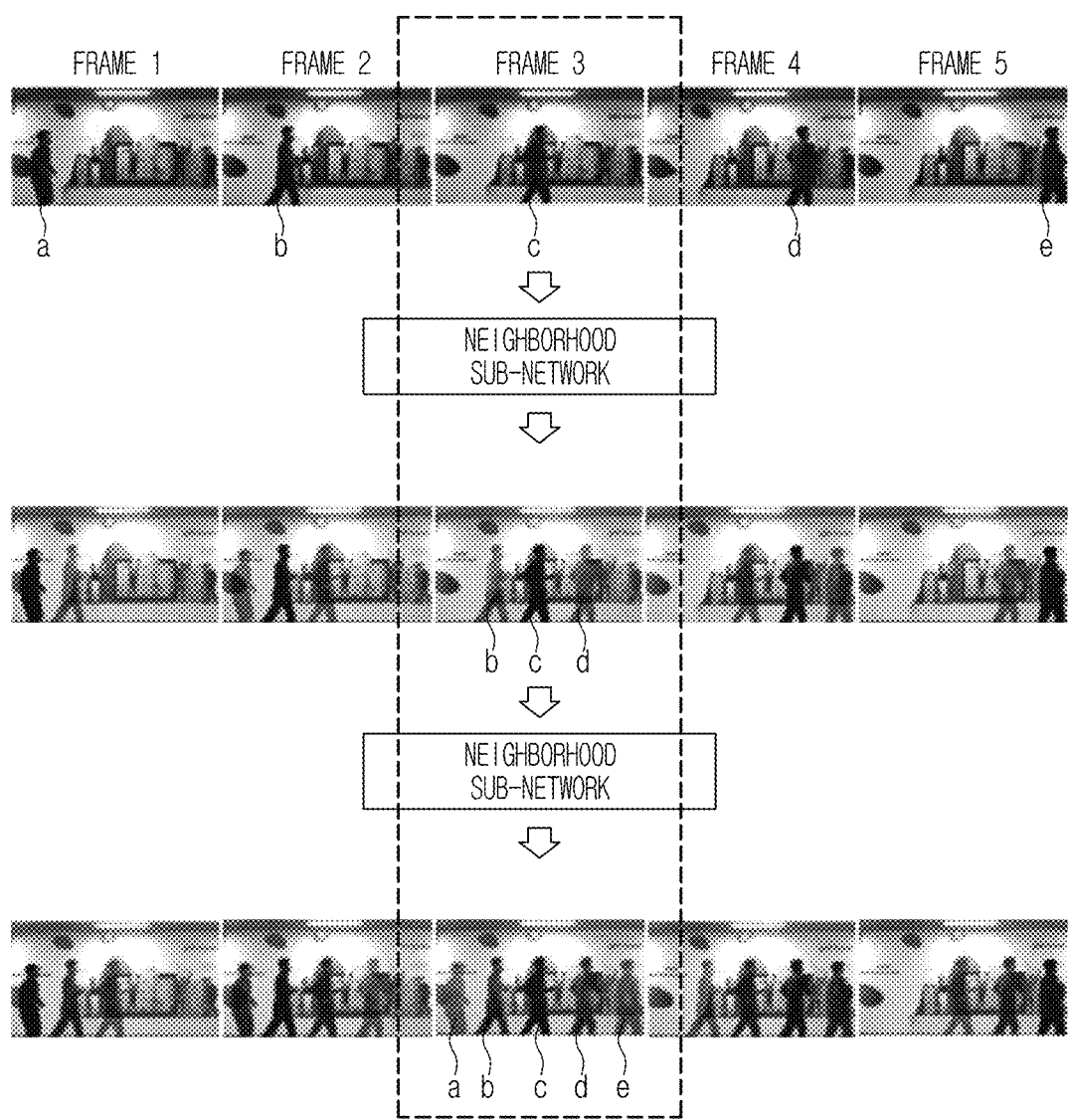
FIG. 8D is a schematic diagram of a local branching effect in an example of an embodiment.

The local branch may use a neighborhood sub-network to obtain temporal information through convolution in the time dimension. That is, to obtain the influence of adjacent frames on the current frame from a specific time perspective. That is, consider the relationship between the feature corresponding to each second image frame and the feature of an adjacent second image frame, because the information from adjacent frames helps to identify the operation of the current frame. For example, the action type of a certain video is dancing. Here, the third frame of image does not have obvious feature for the action type of dancing. The action in the third frame looks like it is walking, and it is impossible to determine whether it is dancing. However, because of the continuous information of four (4) adjacent frames, it can be known with certainty that it is a dancing action. Therefore, it is very important to increase the temporal receptive field and obtain more temporal information. The intuitive effect it produces is shown in FIG. 8D. After the input feature passes through the neighborhood sub-network, the third frame image will obtain the information of the second frame image and the fourth frame image, and it passes through the neighborhood sub-network again. Since the second frame has obtained the information of the first frame, the fourth frame has obtained the information of the fifth frame, so the third frame obtains the information of the first and fifth frames indirectly while acquiring the information of the second and fourth frames. For example, there is a person running in the first frame image to the fifth frame image, and they respectively contain information a, b, c, d, and e (a, b, c, d, and e represent the same person). After passing through the neighborhood sub-network once, the third frame image obtains the information b of the second frame image and the information d of the fourth frame image. At this time, the third frame image may contain information b, c, d, and the first frame contains information a, b, c, while the fourth frame contains information c, d, e. Through the neighborhood sub-network again, the third frame obtains the information of the second frame and the information of the fourth frame again. At this time, the third frame of image may contain information a, b, c, d, and e, and this helps to recognize a person's actions from the point of view of time.

Figure 8E:
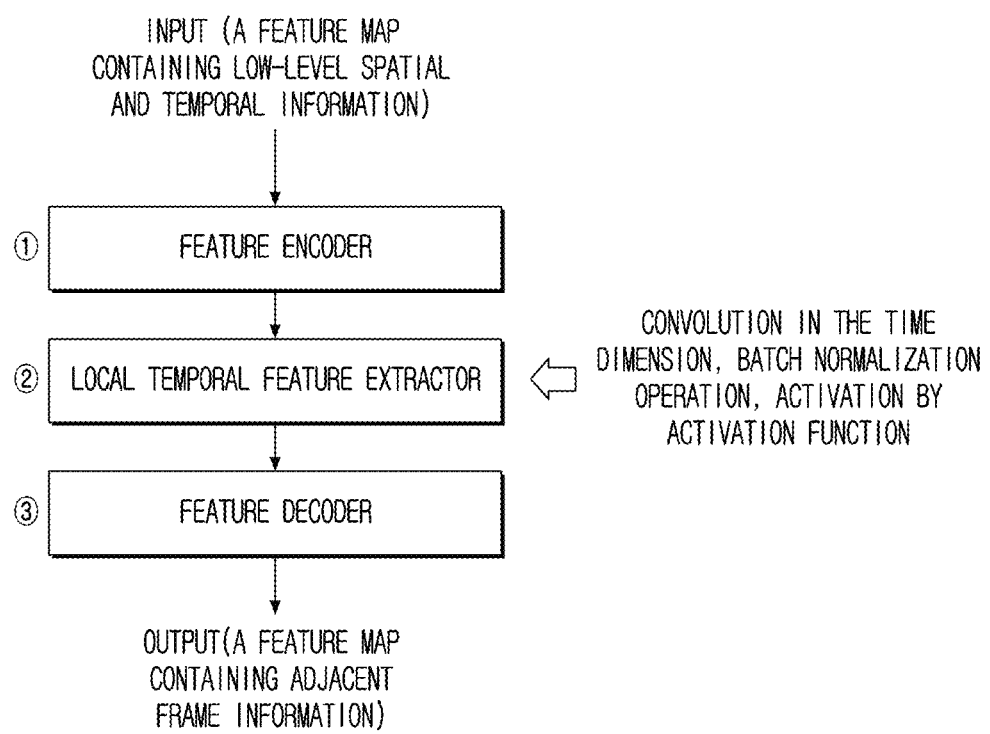
FIG. 8E is a schematic diagram of a neighborhood sub-network in an example of an embodiment.

Specifically, an example of the neighborhood sub-network is shown in FIG. 8E. A feature map containing low-level spatial information and temporal information is used as input. A feature encoder is used to encode the feature map into a high-dimensional space to extract richer temporal semantic information. An original feature map may have information such as color and texture, and higher dimensions may be used to obtain temporal semantic information such as direction, speed, and rotation. Then, through a local temporal feature extractor, convolution is performed in the time dimension, and the batch normalization (BN) operation is performed at the same time, and the activation function is used for the activation operation. The local temporal feature extractor aims to obtain temporal information from adjacent frames. The adjacent frames may include an immediately preceding frame of the current frame, and/or an immediately following frame of the current frame. Each operation may obtain more features of the current frame from the previous frame and the next frame, this increases the temporal receptive field of the action state, and solves the problem of insufficient temporal semantic information. Because, for some actions, temporal information is more important than spatial information, that is, the neighborhood sub-network focuses on acquiring the action state. For example, in FIG. 8D, in the third frame, the man is moving. Through the local temporal feature extractor, frame 3 will obtain information from frames 2 and 4 to get the man's action state. In an embodiment, the temporal receptive field may be expressed as Δt=2*n+1, where n represents the number of neighborhood sub-networks. Finally, a feature decoder is used to decode and integrate the features, and output a feature map containing the information of adjacent frames.

Figure 8F:
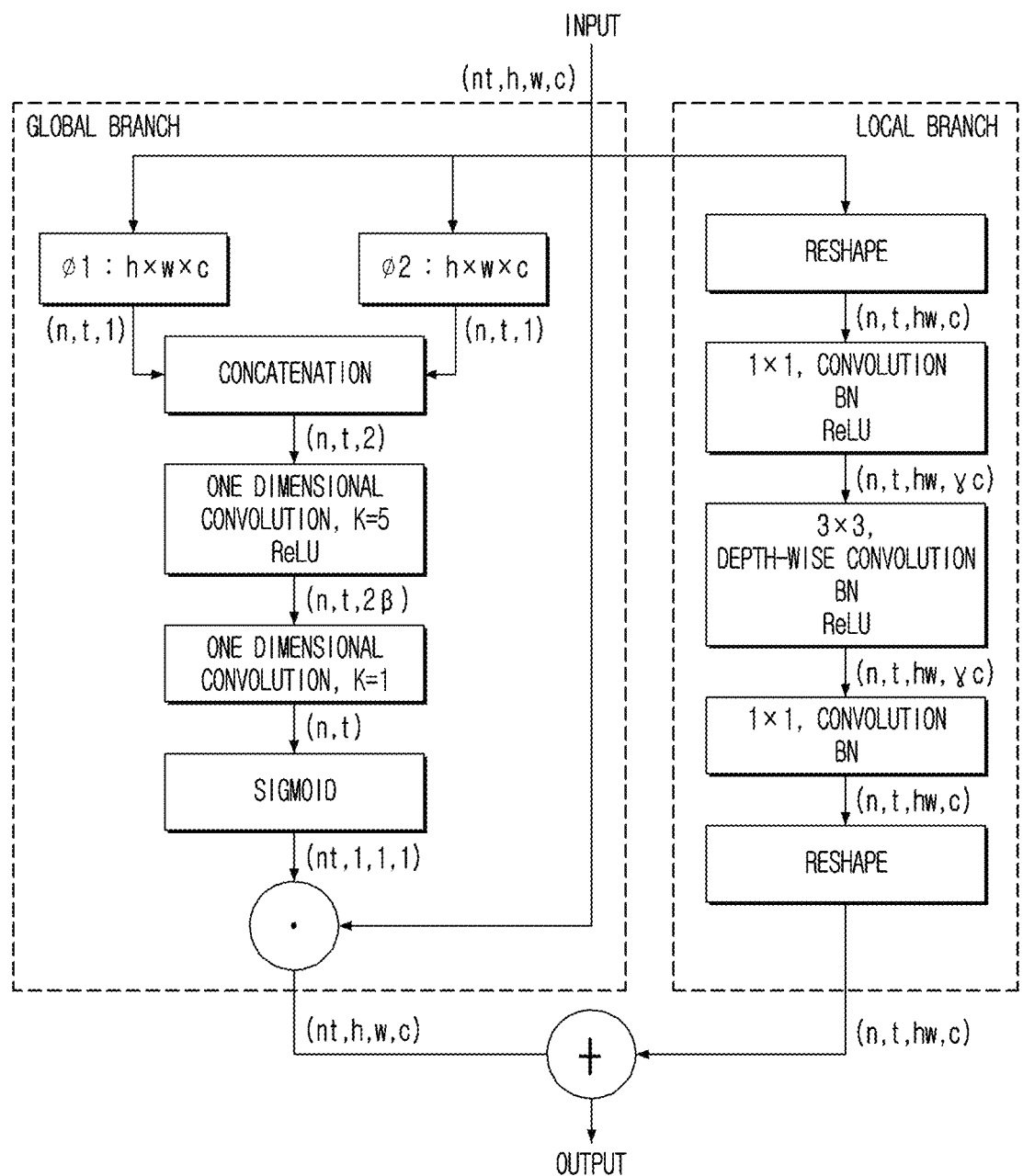
FIG. 8F is a schematic structural diagram of a temporal residual module in an example of an embodiment.

For example, the structure of a temporal residual module is shown in FIG. 8F, where the size of the input feature is (n*t, h, w, c), n is the number of batches (during training, an optional value is 128, and when applied, n=1), t is t features corresponding to t second image frames in a target video segment, h is the height of the feature, w is the width of the feature, and c is the number of channels of the feature. The processing flow of the global branch and the local branch in the Figure are respectively described below.

The processing flow of the global branch may specifically include the following steps:

(1) reshaping the size of an input feature to (n, t, h, w, c), and then performing average pooling φ1 and maximum pooling φ2 on the input feature in the space and channel dimensions, and the operations φ1 and φ2 are as follows:

$$X_{1t} = \phi_1(X) = \frac{1}{h \times w \times c} \sum_{i,j,k} x_{t,i,j,k}$$

$$X_{2t} = \phi_2(X) = \frac{1}{h \times w \times c} \max_{i,j,k} x_{t,i,j,k}$$

The size of the feature output by φ1 and φ2 is (n, t, 1).

(2) concatenating the two pooled results together in c dimension, the output feature size being (n, t, 2).

(3) performing one-dimensional convolution in t dimension, the length of the convolution kernel being k (an optional parameter is 5), the expansion coefficient being β (an optional parameter is 4), the number of channels being increased by β times, the size of the output feature being (n, t, 2β), and at the same time, the Rectified Linear Unit (ReLU) activation function being used for activation;

(4) reducing the number of channels to 1 using one-dimensional convolution, the length of the convolution kernel being 1 (k=1), and the output feature shape being (n, t);

(5) using the Sigmoid function to normalize the result to the range of 0-1, the size of the output feature being (n*t, 1, 1, 1), the output feature may be understood as the weight of the temporal information corresponding to each second image frame in each batch of second image frames (i.e., t second image frames) in the action recognition process, and the weight may also be referred to as the attention information corresponding to each second image frame; and (6) performing the inner product operation between the result of (5) and the original input feature to obtain the output feature of the global branch, that is, the corresponding first feature, and the size of the first feature is (n*t, h, w, c).

The overall calculation formula is as follows:

$$L(X)=\text{Sigmoid}(\text{Conv1}D(\delta(\text{Conv1}D(\text{Concat}(X_{1t},X_{2t}),K, 2\beta)),1,1))$$

Here, L(X) is the first feature of the global branch output, Concat (X1t,X2t) means concatenating two features X1t and X2t, Conv1D (A,B,C) means that the input feature A is convolved using a one-dimensional convolution kernel of size B, and the number of output channels is C, δ represents the ReLU activation function, and Sigmoid represents the Sigmoid function.

The processing flow of a local branch may specifically include the following steps:

(1) reshaping the size of the input feature to (n, t, h*w, c);

(2) using a 1×1 convolution kernel to expand the number of channels toy times (an optional parameter is 6), and performing Batch Normalization (BN) operation and ReLU activation operation. A corresponding formula for this step is as follows:

$$X'=\delta(PW(X,(1,1),\gamma C))=\delta(BN(\text{Conv2}D(X,(1,1),\gamma C))$$

Here, PW (A,B,C) means using a two-dimensional convolution kernel of size B to perform convolution processing on the input feature A, and then perform batch normalization processing, and the number of output channels is C, Conv2D (A, B, C) represents using a two-dimensional convolution sum of size B to perform convolution processing on the input feature A, and the number of output channels is C, X' is the output feature of the process.

(3) using a 3×1 convolution kernel to perform depthwise convolution in the time dimension, so that adjacent second image frames exchange information with each other, that is, each second image frame obtains the feature information of an adjacent second image frame, and simultaneously performing BN operation and ReLU activation operation, and the formula corresponding to this step is as follows:

$$X'=\delta(DW(X,(3,1),\gamma C))=\delta(BN(\text{DepthConv2D}(X,(3,1),\gamma C))$$

Here, DW(A,B,C) means that the input feature A is subjected to depthwise convolution processing using a two-dimensional convolution kernel of size B, and then batch normalization processing is performed, and the number of output channels is C, DepthConv2D (A, B, C) means using a two-dimensional convolution kernel of size B to perform depthwise convolution processing on the input feature A, and the number of output channels is C, X' is the output feature of this step;

(4) using a 1×1 convolution kernel to restore the number of channels to c and perform the BN operation, and the corresponding formula for this step is as follows:

$$X'=PW(X,(1,1),C)=BN(\text{Conv2D}(X,(1,1),C)$$

(5) reshaping the result into the same shape as the input feature (n*t, h, w, c), outputting the second feature, and the overall calculation formula is as follows:

$$G(X)=PW(\delta(DW(\delta(PW(X,(1,1),\gamma C)),(3,1),\gamma C)),(1,1),C)$$

Here, G(X) is the second feature of local branch output.

Finally, the results of the two branches are added according to corresponding positions to get the output of TRM. The formula is as follows:

$$Z=L(X)+G(X)$$

Figure 8G:
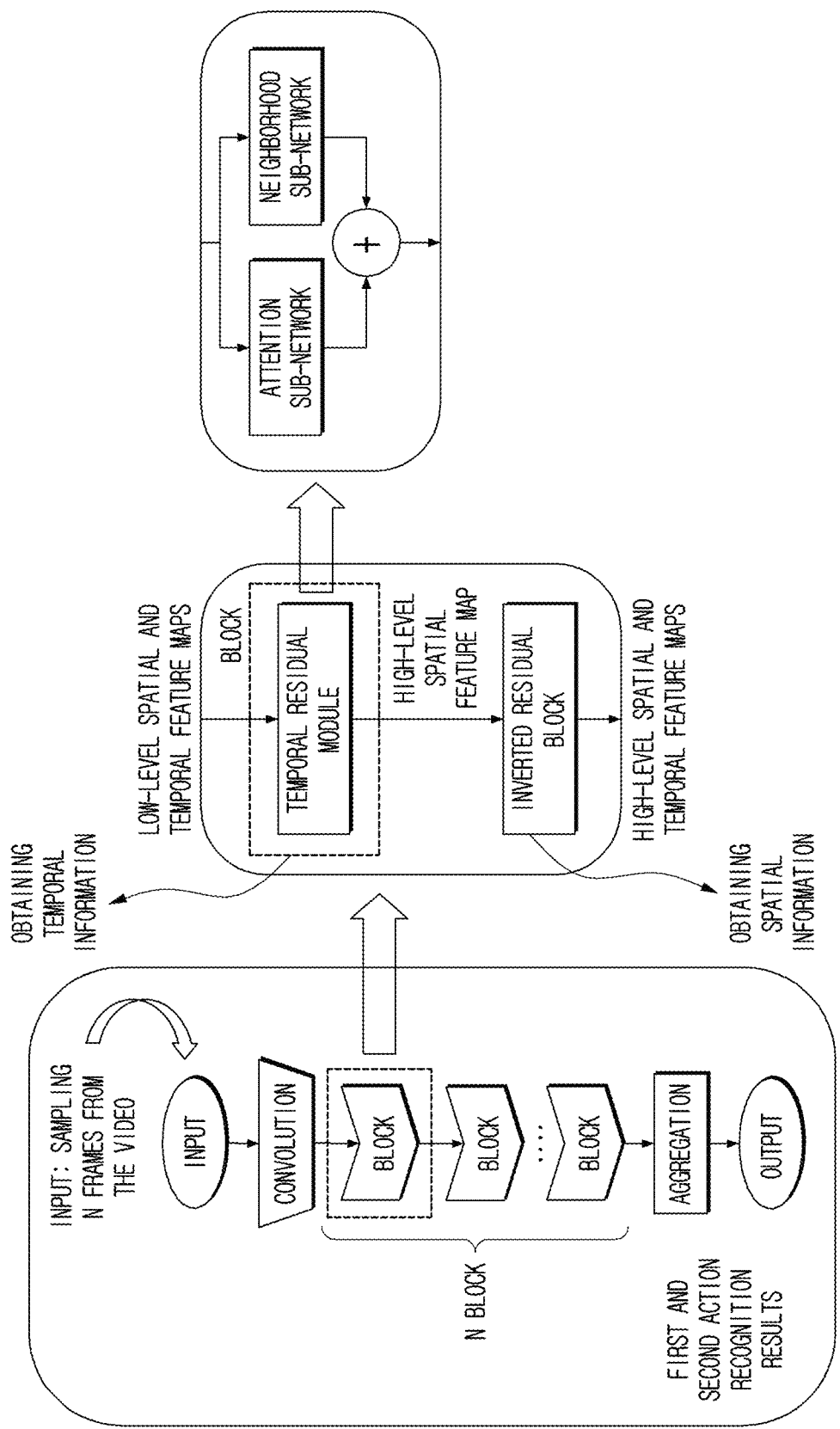
FIG. 8G is a schematic diagram of using a temporal residual network to perform action recognition in an example of an embodiment.

In an embodiment of the present disclosure, FIG. 8G shows a complete flow of action recognition using a temporal residual network. Compared with the temporal mobile network, the temporal residual network may solve the problem of insufficient temporal semantic information. Specifically, as shown in the left part of FIG. 8G, n frames (second image frames) are sampled from a video as input, and a first action recognition result and a second action recognition result are output after convolution, multiple temporal residual blocks, integration, and other operations in a temporal residual network. Here, each temporal residual block is shown in the middle part of FIG. 8G, and semantic information may be obtained from the frames and the feature map. Specifically, for each temporal residual block, temporal information may be obtained through the temporal residual module, and spatial information may be obtained through an inverted residual block, so as to obtain high-level spatial and temporal feature maps (or called high-level semantic feature maps). Further, the temporal residual module in each temporal residual block is shown in the right part of FIG. 8G, and the temporal residual module includes an attention network and a neighborhood sub-network, which may obtain the importance information of the frame and the information of an adjacent frame respectively. The results of the two networks are added to obtain the output of the temporal residual module, that is, the low-level spatial and temporal feature maps may be converted into the high-level temporal feature maps.

In embodiments of the present disclosure, multiple temporal residual modules may be used to extract the temporal information corresponding to at least one second image frame based on the input feature, and the corresponding output feature may be obtained based on the input feature and the temporal information.

In general, using multiple temporal residual modules will expand the temporal and spatial receptive field and extract higher-level temporal features.

Here, expanding the temporal receptive field means that the scope that can be seen in the time dimension is wider, and the large temporal receptive field pays more attention to the continuity of an action. Take a video as an example. Assuming that the input at this time is a video frame at time point A, when a block with a temporal residual module is used for a first time for forwarding, a slightly wider content can be seen in the time dimension. That is, video frames of a larger time range (a first range) including time point A can be seen. When the block with the temporal residual module is used for forwarding for a second time, it is possible to see a wider content in the time dimension than when the block is used for the first time, that is, video frames of a larger time range including the first range are seen.

Enlarging the spatial receptive field can see more content in the spatial dimension, which helps the model understand what is in the picture at the semantic level. Take a frame as an example, and the frame contains a person who is shooting a basketball. Using a block with a temporal residual module, you may only see a small part of the person's upper body, and it is difficult to understand what this part is. If two blocks with temporal residual modules are used, a larger range can be obtained. You may see a small part of the upper body plus the lower body, maybe like some parts of a person, but you can't be sure. If four blocks with temporal residual modules are used, and a larger range is obtained, it is possible to see the entire human body. Currently, it is easier to determine that the frame contains a person.

More blocks with temporal residual modules may extract higher-level features, and each block may output higher-level features than the input features. Take two blocks as an example. In fact, more blocks will be used. The picture contains a basketball hoop. The input of block 1 is the feature of the upper left corner of the backboard in the picture. The feature level of this part is relatively low and only contains color information. The output of block 1 and the input of block 2 are the features of the half of the backboard in the picture, which contains information such as the pattern of the backboard. Here, block 1 can understand not only the color feature, but also the line feature, and the output information level has become higher. The output of block 2 is the feature of the entire backboard and basket in the picture. In addition to understanding the color feature and line feature, it can also understand the position information. At this time, the model understands that the picture contains a basket through the two blocks, and the information level becomes higher. At this point, the semantic information has been extracted, but the position of the basket and the relationship between the basket and surrounding objects are still unknown. If a higher level of information is needed, more blocks are needed.

In embodiments of the present disclosure, some convolution kernels are used to extract temporal information, and the corresponding time dimension information is extracted by controlling the size of the convolution kernels to expand the temporal receptive field. For example, if the size of the convolution kernels used in a specific position is $3*1*c_{in}$ (number of input channels)*$c_{out}$ (number of output channels), the temporal receptive field of a block is 3. Some convolution kernels are used to extract spatial information, and the corresponding spatial information is extracted by controlling the size of the convolution kernels. For example, if the size of the convolution kernels used in a specific location is $3*3*cm*c_{out}$, the spatial receptive field is $3*3$ (representing length and width respectively). Use convolution and residual operations to extract high level features, and increase the richness of features by increasing the number of channels of the convolution kernels. For example, use a convolution kernel with a shape of $w*h*c_{in}*1$ at the very beginning to extract color features. Use multiple blocks for stacking to extract higher-level features.

In embodiments of the present disclosure, sufficient temporal semantic information may be obtained through at least one temporal residual module to improve the accuracy of subsequent action recognition and action localization.

In an embodiment of the present disclosure, based on the first action recognition result, acquiring a second action recognition result includes:
  aggregating the first action recognition result of the at least one second image frame to obtain the second action recognition result.

In an embodiment of the present disclosure, the first action recognition result includes a first probability value that the actions contained in the corresponding second image frame are of respective preset action types; the second action recognition result includes a second probability value that the actions contained in the corresponding target video segment are of respective preset action types; and aggregating the first action recognition result of the at least one second image frame to obtain the second action recognition result includes:
  respectively acquiring an average value of the first probability values corresponding to respective preset action types in the at least one second image frame;
  normalizing the average value of the first probability values corresponding to respective preset action types to obtain probability values corresponding to respective preset action types; and
  taking the probability values of respective preset action types as the second probability value that the actions contained in the target video segment are respective preset action types, that is, acquiring the second action recognition result.

Here, the first probability value may be a non-normalized log probability Logits value.

Figure 9:
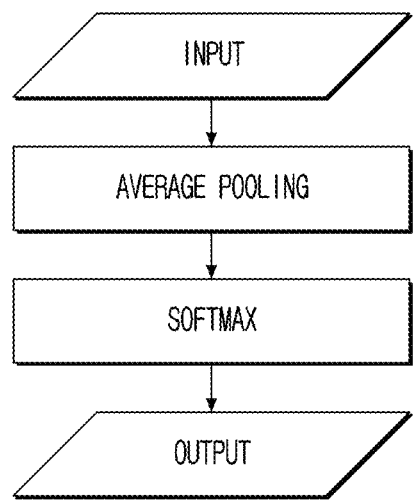
FIG. 9 is a schematic flowchart of acquiring a second action recognition result of a target video segment in an example of an embodiment.

Specifically, the size of the first action recognition result is (n*t, m+1), where n is the number of target video segments in a batch (an optional value is 128 during training, and n=1 during application), t is the number of second image frames in a target video segment, and m+1 is the number of preset action types, that is, the recognizable action type m plus other action type. Then, as shown in FIG. 9, aggregating the first action recognition result of the at least one second image frame to obtain the second action recognition result may specifically include the following steps:
  (1) the size of each first action recognition result is (n*t, m+1), reshaping its size to (n, t, m+1), and then averaging each first action recognition result in the t dimension pooling, getting the pooling result, the formula for this step being as follows:

$$Y = \frac{1}{t}\sum_i x_{i,m+1}$$

Here, $x_{i,m+1}$ is a first probability value (which may be a Logits value) corresponding to each preset action type in an $i^{th}$ second image frame; and
  (2) the size of the pooling result obtained in (1) being (n, m+1), constraining the result to between 0-1 through the softmax function, and acquiring the second action recognition result of the target video segment, the formula for this step is as follows:

$$Z = \text{Softmax}\left(\frac{1}{t}\sum_i x_{i,m+1}\right)$$

The temporal residual network may be constituted with pre-train network parameters that are obtained based on a training sample, and the trained model can be used for action recognition. When training, the training sample is a video segment that contains only one action, and its label is the sequence number of the action type, such as eating 1, running 2, and so on. The type number of other types is 0, and the samples that do not belong to the recognizable action of the temporal residual network can be marked as other samples. Here, in the training, the loss function used by the temporal residual network is:

$$L = -\sum_{j=1}^{m} g_j \log z_j$$

Here, for the samples of the target video segment, L is the loss value corresponding to the target video segment sample, j represents an action type number, and m is a maximum action type number of the target video segment, $g_j$ represents the real label of the target video segment (if the target video segment corresponds to the $j^{th}$ type of action type, $g_j=1$, and other $g_j=0$, for example, assuming that the action type sequence number j=1, 2, then, if the action type sequence number corresponding to the target video segment sample is 1, then the target video segment sample $g_1=1$, $g_2=0$), $z_j$ represents a predicted value of the temporal residual network, that is, the probability that the action type corresponding to the target video segment sample is the $j^{th}$ action type.

In an embodiment of the present disclosure, acquiring an action localization result of the video based on the first action recognition result and the second action recognition result includes:
  based on the first action recognition result and the second action recognition result, acquiring the action localization result of the corresponding target video segment; and
  based on the action localization result of the target video segment, acquiring the action localization result of the video.

Figure 10:
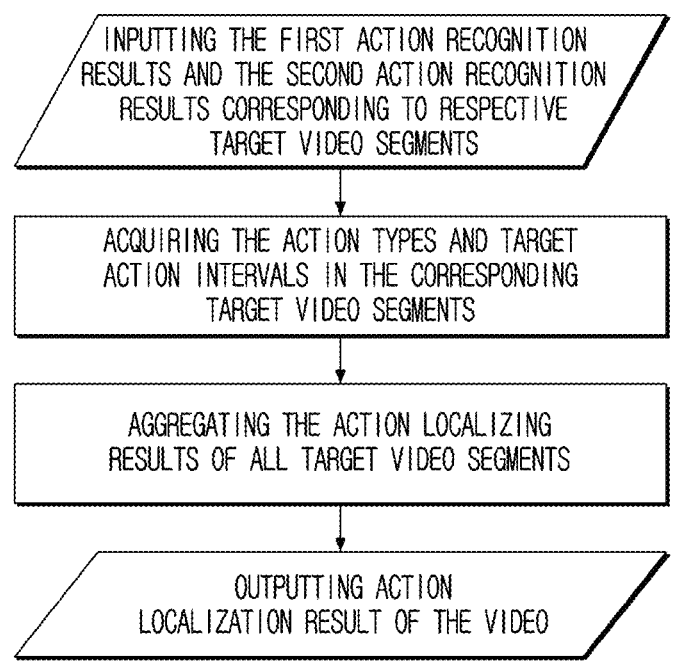
FIG. 10 is a schematic flowchart of acquiring an action localization result of a video in an example of an embodiment.

Specifically, after acquiring the first action recognition results of the multiple second image frames in each target video segment and their own second action recognition results according to the foregoing manner, the corresponding action localization results are obtained according to these recognition results. Then, the action localization results of respective target video segments are aggregated to obtain the action localization result of the video. As shown in FIG. 10, acquiring the action localization result of the video may include the following steps:

(1) inputting the first action recognition results and the second action recognition results corresponding to respective target video segments;

(2) acquiring the action types and target action intervals in the corresponding target video segments according to the first action recognition results and the second action recognition results;

(3) integrating the action localization results of all target video segments according to the action type and target action interval, and aggregating adjacent actions of the same type into a same action interval; and (4) outputting the type and the starting time point and ending time point of each action.

In a feasible implementation, based on the first action recognition result and the second action recognition result, acquiring the action localization result of the corresponding target video segment includes:

determining at least one candidate proposal based on the first action recognition result and the second action recognition result, the candidate proposal being used to indicate the action interval of any preset action type in the target video segment;

based on each candidate proposal, recognizing a corresponding action interval in the target video segment, and determining a target candidate proposal; and taking an action type corresponding to the target candidate proposal and an action interval corresponding to the target candidate proposal as the action localization result of the target video segment.

Specifically, the target video segment recognition result includes a first action recognition result of each second image frame in the video segment and the second action recognition result of the target video segment. Through an adaptive proposal generator, and according to the recognition result of the target video segment, a smaller number of candidate proposals with higher accuracy and different time scales (that is, a series of sub-time intervals) are generated. Here, any preset action type may correspond to one or more candidate proposals. In the time range of each candidate proposal, the features of a corresponding range of the target video segment are extracted and recognized, and the recognition result is finally obtained. The method can improve the accuracy and continuity of the action localization, and can reduce the calculation.

In an embodiment of the present disclosure, the step of determining at least one candidate proposal based on the first action recognition result and the second action recognition result may be realized by the following steps:

based on the first action recognition results and the second action recognition results, determining a proposal threshold corresponding to at least one preset action type; and for each preset action type in the at least one preset action type, determining at least one candidate proposal based on the corresponding proposal threshold and the first action recognition results.

Specifically, according to the first action recognition results and the second action recognition results, each proposal threshold is adaptively generated. As an example, FIG. 11A shows an example of the first action recognition results (score per frame) and the second action recognition results (sub-video segment score, where the sub-video segment can be understood as the aforementioned target video segment) of a target video segment. The following takes the preset action type "jump" in FIG. 11A as an example to illustrate the method of generating the corresponding proposal threshold.

As shown in FIG. 11A, the average score of the jump (sub-video segment score) is 0.76, and the highest score of the jump in all the frames is 0.95. In an embodiment of the present disclosure, the calculation formula of the proposal threshold is:

$s_1 = \min(0.5, \text{average score})$ $s_2 = \max \text{score}$

Here, the Average score in the formula is the average jump score of 0.76, and the Max score is the highest score in all the frames, which is 0.95.

The adaptive proposal threshold is calculated through $s_1$ and $s_2$, and the number of adaptive proposal thresholds can be determined according to requirements, which is not limited in the embodiment of the present disclosure. The specific calculation formula is as follows:

$$\tau_i = \frac{i}{n} s_1 + \frac{n-i}{n} s_2$$

Here, $\tau_i$ represents the $i^{th}$ threshold, and n represents the number of nominated thresholds. Taking n=3 as an example, the calculated jump proposal threshold is:

$$\begin{cases} \tau_1 = 0.33 s_1 + 0.66 s_2 \\ \tau_2 = 0.66 s_1 + 0.33 s_2 \\ \tau_3 = s_1 \end{cases}$$

In this way, for the preset action type "jump", three thresholds are obtained.

Further, after a proposal threshold of a preset action type is obtained, the proposal threshold and the result of each frame having the preset action type are combined to obtain the candidate proposal of the preset action type.

Figure 11B:
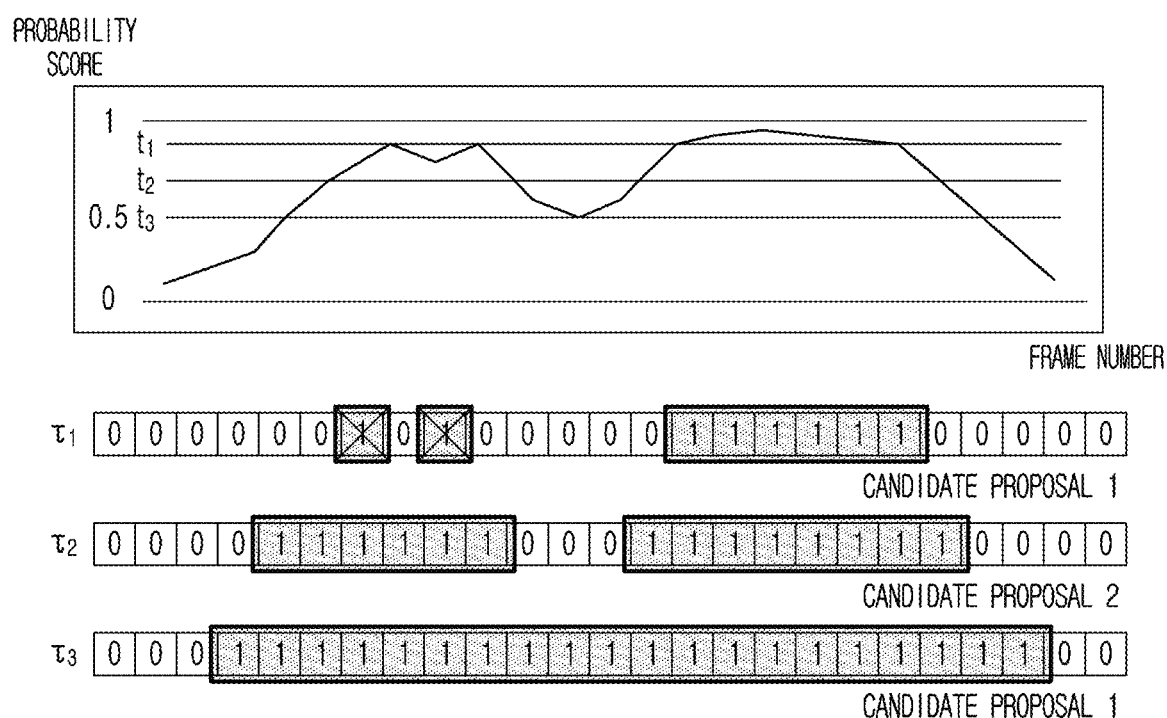
FIG. 11B is a schematic diagram of using a proposal threshold to obtain a candidate proposal according to an embodiment.

As an example, as shown in FIG. 11B, a curve in FIG. 11B is a (probability) scoring curve for each frame with a preset action type, and the abscissa represents time. Three horizontal solid lines are three proposal thresholds, and a candidate proposal at different scales may be obtained through the three horizontal solid lines. Optionally, each candidate second image frame is determined, the action contained in each candidate second image frame has a preset action type, and the first probability value of the preset action type is greater than a corresponding proposal threshold. Based on the respective candidate second image frames (time values thereof), at least one candidate proposal is determined. That is, a range greater than any proposal threshold is a candidate proposal. Optionally, if the time length of a candidate proposal is less than a certain value, it can be directly discarded to reduce the amount of calculation. For example, in FIG. 11B, if two candidate proposals with a time length of 1 determined according to $\tau_1$ are directly discarded, only one candidate proposal is obtained according to $\tau_1$. Based on $\tau_2$ and $\tau_3$, 2 and 1 candidate proposals are obtained respectively. Here, the candidate proposal corresponding to $\tau_1$ focuses more on accuracy, and the candidate proposal corresponding to $\tau_3$ focuses more on continuity. Therefore, the embodiments of the present disclosure adopt different time granularities to generate candidate proposals.

In this way, candidate proposals with various preset action types may be obtained. In actual applications, it is unnecessary to determine candidate proposals for each preset action type, for example, it may directly ignore the preset action types whose sub-video segment scores are lower than a certain value or each frame score is lower than a certain value, those skilled in the art can make settings according to actual conditions, and the embodiments of the present disclosure are not limited herein.

By adaptively generating thresholds and generating candidate proposals with different time scales, the number of proposals can be reduced, and proposals with different time granularities can be filtered out, with high confidence to reduce calculations.

Furthermore, after acquiring a series of proposals, based on each candidate proposal, recognizing a corresponding action interval in the target video segment, and determining a target candidate proposal includes:

acquiring a video segment feature corresponding to the target video segment;

based on each candidate proposal, determining a video segment feature of a corresponding action interval, and acquiring a corresponding candidate feature; and recognizing each candidate feature and determine the target candidate proposal.

Here, the video segment feature corresponding to the target video segment can be a feature extracted from the target video segment by any feature extraction method, or directly is the output feature of the last temporal residual block output from the above-mentioned multiple temporal residual blocks.

Specifically, based on each candidate proposal, the video segment feature of the corresponding action interval is determined as the candidate feature. That is, based on the time range indicated by each candidate proposal, the feature of the corresponding time range is determined in the target video segment as the candidate feature.

In a feasible implementation, the process can also use a sampler to sample a fixed-length feature from the video segment feature corresponding to the target video segment within the time range of the candidate proposal. Specifically, based on each candidate proposal, determining a video segment feature of a corresponding action interval, and acquiring a corresponding candidate feature, includes: determining a video segment feature of an action interval corresponding to each candidate proposal; and sampling the video segment features of the respective action intervals corresponding to respective candidate proposals as a feature of a preset length to obtain the corresponding candidate feature.

As an example, suppose the number of frames of the sub-video segment (target video segment) is 25 frames, and each frame has its corresponding recognition result and its corresponding feature map. If a candidate proposal contains 12 frames, and the fixed input of a recognizer used for recognition is 8 frames, then a certain method (such as linear interpolation) needs to be used to convert a 12-frame feature map to a 8-frame feature map, and then the 8-frame feature map can be input to the recognizer for recognition.

In an embodiment of the present disclosure, based on each candidate proposal, determining a video segment feature of a corresponding action interval, and acquiring a corresponding candidate feature, includes:

based on each candidate proposal, recognizing corresponding action intervals in the target video segment, and acquiring action recognition scores corresponding to respective candidate proposals;

for each candidate proposal, determining a continuous action recognition score of the candidate proposal according to the action recognition score and action interval corresponding to the candidate proposal; and determining a candidate proposal with the highest continuous action recognition score as the target candidate proposal.

Here, the recognition process can use a preset recognizer, and those skilled in the art can select or train a suitable recognizer according to actual conditions, and the embodiments of the present disclosure are not limited herein.

In the embodiments of the present disclosure the recognition score of a short candidate proposal will be higher than that of a long candidate proposal, because the long proposal always contains some transitional states. For example, in FIG. 11B, the candidate proposal corresponding to $\tau_1$ is included in the candidate proposal corresponding to $\tau_3$. It can be seen from the score curve that the scores of the frames of the candidate proposals corresponding to $\tau_1$ are all high, but the interval is short, while some scores of the frames of candidate proposals corresponding to $\tau_3$ are very low, but the interval is longer. In order to maintain continuity based on accuracy, a time scale can be added to the recognition standard. Specifically, after recognizing all candidate proposals and acquiring the corresponding action recognition scores, the recognition results can be converted through a formula, which is as follows:

$$s'=s\times\log \Delta t$$

Here, s is the action recognition result (action recognition score) of a candidate proposal, $\Delta t$ is the time length of the candidate proposal (action interval), s' is the final recognition result (continuous action recognition score), and the final recognition result considers the continuity of the action. Take a candidate proposal (target candidate proposal) with the highest score in a certain type among all the final recognition results, the recognized action type is the action type of the sub-video segment (target video segment), and the recognized starting time point and ending time point (action interval) are the starting time point and ending time point of the sub-video segment.

For example, the localization result of a continuous action is shown in table 2. The original score of candidate proposal A is the largest, but it is too short, so the final score is the smallest. Candidate proposal B is the longest, but the original score thereof is too small, so the final score is not large. Candidate proposal C has a good original score and appropriate length, so it can be used as a target candidate proposal.

TABLE 2

|  | S | $\Delta$At | S' |
|---|---|---|---|
| candidate proposal A | 0.92 | 4 | 0.553 |
| candidate proposal B | 0.69 | 8 | 0.623 |
| candidate proposal C | 0.82 | 6 | 0.638 |

Figure 11C:
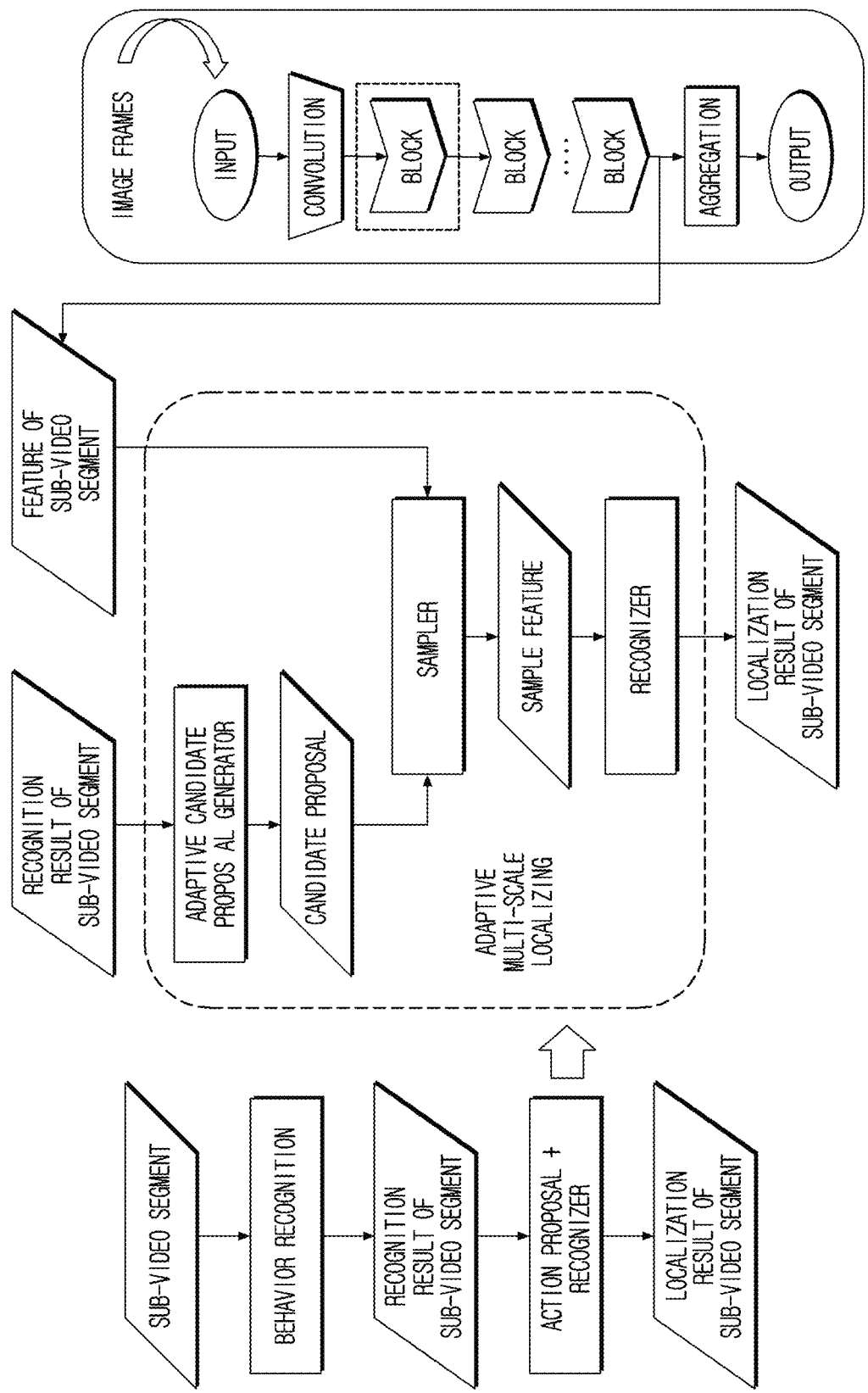
FIG. 11C is a schematic flowchart of an action localization according to an embodiment.

In the embodiments of the present disclosure, a specific example is shown in FIG. 11C. The left part of FIG. 11C shows the overall scheme, which performs behavior recognition on the sub-video segment to obtain the sub-video segment recognition results (that is, the first action recognition result and the second action recognition result). Then through the action proposal and recognizer, the sub-video segment localization result (that is, the action localization result of the target video segment) is obtained. Here, the action proposal (adaptive proposal generator) and recognizer are the action localization part of the video. The method used in this example is adaptive multi-scale localization. The adaptive proposal generator generates candidate proposals with different time scales, and the recognizer obtains the final action distinction and action type in terms of accuracy and continuity. In the process shown in the middle part of FIG. 11C, the sub-video segment recognition result refers to the result of action recognition, that is, the aforementioned first action recognition result and second action recognition result. The feature of the sub-video segment uses the intermediate result of the behavior recognition, which can be the output feature of the last temporal residual block among the multiple temporal residual blocks as shown in the right part of FIG. 11C, and for a specific implementation manner, please refer to the description of FIG. 8G, which will not be repeated here. Through the adaptive proposal generator, according to the sub-video segment recognition results, generate candidate proposals (that is, a series of sub-time intervals). Then, through the sampler, within the time range of the candidate proposal, the fixed-length features are sampled from the sub-video segment features and input to the recognizer, and finally the sub-video segment localization result is output, that is, the action localization of the target video segment result.

Furthermore, acquiring the action localization result of the corresponding target video segment based on the first action recognition result and the second action recognition result includes:
 determining a target action type in the target video segment based on the second action recognition result;
 based on the first action recognition result, acquiring a target key image frame corresponding to the target action type;
 acquiring a target action interval corresponding to the target action type based on the target key image frame; and
 taking the target action type and the corresponding target action interval as the action localization result of the target video segment.

Figure 12A:
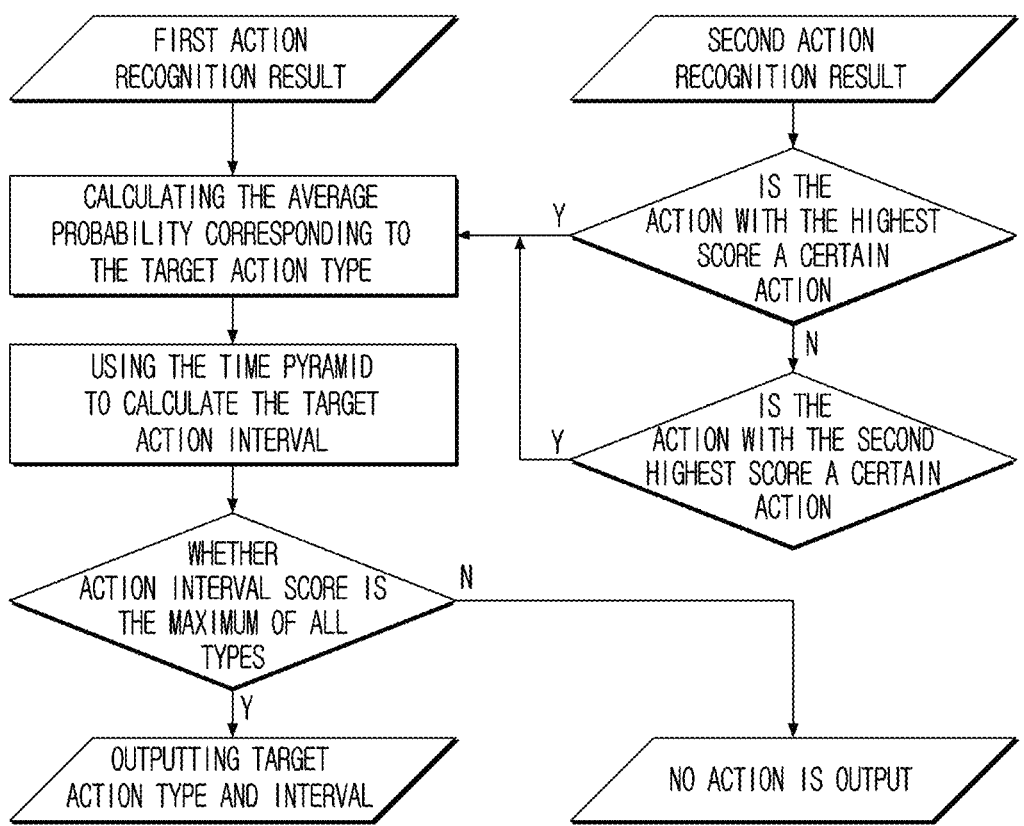
FIG. 12A is a schematic flowchart of acquiring a target action type and target action interval of a target video segment in an example of an embodiment.

Specifically, the recognition results of the target video segment include a first action recognition result X of each second image frame in the video segment (the size can be (k, m+1), where k is the frame number, and m+1 is the action type number) and a second action recognition result Y of the target video segment (the size can be a one-dimensional vector, and the length is m+1). By acquiring the target action interval corresponding to the target video segment, the starting time and ending time of the action in the target video segment can be determined, and at the same time, the target action type in the target video segment can be determined. As shown in FIG. 12A, the specific process for determining the target action interval and target action type may include the following steps:
 (1) First, according to the second action recognition result of the target video segment, the type number of the target action of the target video segment is obtained according to the following formula:

$$a = \mathrm{argmax}(Y)$$

That is, a preset action type corresponding to the maximum probability value in the second action recognition result is taken as the target action type. The obtained a is the number of the target action type. If a=0, it means that the video segment is recognized as another action type. It may appear that in the target video segment, a certain action occurs for a very short time, resulting in the target video segment being dominated by other action types, so it is necessary to query whether there is a shorter action interval. At this point, the number of the action type with the second highest probability value in the target video segment is obtained, and the number is taken as a. That is, the action type with the second highest probability value is taken as the target action type.
 (2) Based on the first action recognition result of each second image frame in the target video segment, calculate the average score Sa of the $a^{th}$ action type in k frames by formula:

$$S_a = \frac{1}{k}\sum_i x_{i,a}$$

Here, $\Sigma_i x_{i,a}$ is the sum of the first probability values corresponding to the $a^{th}$ action type in all the second image frames in the sliding window, and k is the first dimension in the first action recognition result, that is, the number of second image frames obtained by sampling.

At the same time, the target key image frame corresponding to the $a^{th}$ action type is calculated by the following formula:

$$t_i = \mathrm{argmax}(X_a)$$

Here, $t_i$ is the target key image frame, and $X_a$ is the first probability value corresponding to the $a^{th}$ action type in each second image frame (it can be the Logits value). Specifically, based on the first action recognition result, obtain the Logits value corresponding to the target action type (that is, the $a^{th}$ action type) of at least one second image frame; and take a second image frame with the largest Logits value corresponding to the target action type in at least one second image frame as the target key image frame.
 (3) Obtain the target action interval corresponding to the target action type based on the target key image frame. For example, the time pyramid method can be used to calculate the target action interval. Specifically, taking the width of at least one preset action interval as a window width, perform a window sliding operation on the target video segment to obtain at least one sliding window containing the target key image frame; Obtain the score value of the sliding window based on the Logits value of the target action type corresponding to a second image frame in the sliding window, and determine the sliding window with the largest score as the target sliding window; obtain the probability values corresponding to respective preset action types in the target sliding window based on the Logits values corresponding to respective preset action types in the second image frame in the target sliding window; if the preset action type corresponding to the maximum probability value in the target sliding window is the target action type, the precise position (action interval) corresponding to the target sliding window is determined as the target action interval, otherwise no action is output.

Here, the score value of the sliding window can be calculated according to the following formula:

$$\mathrm{Score} = \sum_{\Delta t} x_{i,a} - \mathrm{weight} \times s_a$$

Here, Score is the score value of the sliding window, $\Delta t$ is the action interval corresponding to the sliding window, and $x_{i,a}$ is the first probability value corresponding to the $a^{th}$ action type in the $i^{th}$ second image frame (it can be the Logits value), $\Sigma_{\Delta t} x_{i,a}$ is the sum of the first probability values corresponding to the a-th action type in all second image frames in the sliding window, weight represents the weight, which can be set according to the actual situation, for example, it can be 0.5, and Sa is the aforementioned average score. The probability value corresponding to each preset action type in the target sliding window can be calculated according to the following formula:

$$l_j = \frac{1}{start-end} \sum_{i=start}^{end} x_{i,j}$$

$$p_j = \frac{e^{l_j}}{\sum_{j=0}^{m+1} e^{l_j}}$$

Here, $x_{i,j}$ is the value of a $i^{th}$ frame and a $j^{th}$ action in the recognition result of each frame; $p_i$ is the probability value of the $j^{th}$ action in the target action interval (starting time, ending time), $\Sigma_{i=start}^{end} x_{i,j}$ represents the sum of the first probability values corresponding to the $j^{th}$ action type of all second image frames in the target action interval, respectively, and m+1 represents m types of actions and one other type.

Figure 12B:
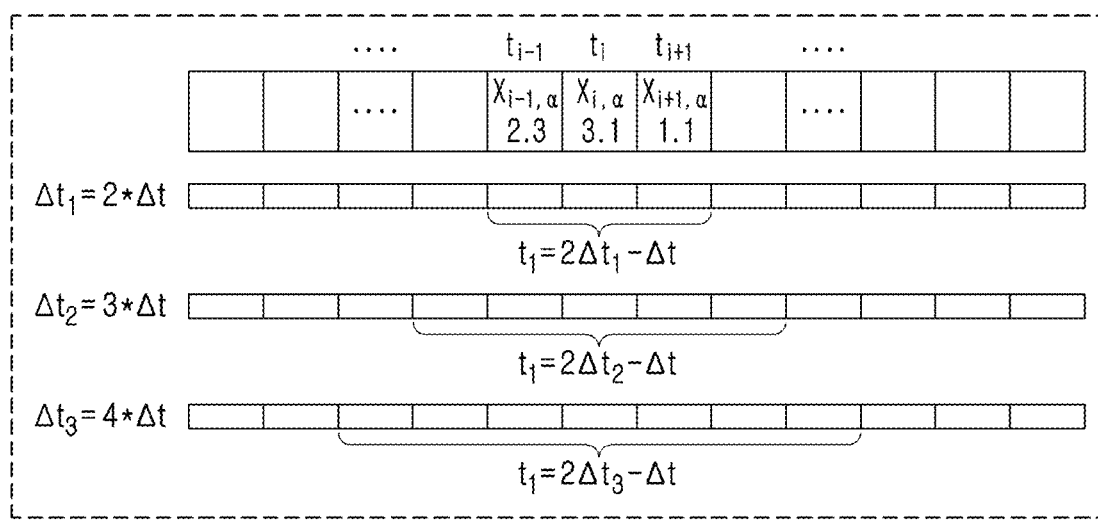
FIG. 12B is a schematic structural diagram of a sliding window of a time pyramid in an example of an embodiment.

For example, as shown in FIG. 12B, using $^\Delta t_1$, $^\Delta t_2$, and $^\Delta t_3$ as the window widths respectively, perform window sliding operation on the target video segment. Since the widths of the three windows increase in sequence, the above window sliding operation can be understood as a pyramid window sliding. Here, $\Delta t$ represents the smallest unit of time, such as 0.1 second. $\Delta t_i$ means different time scales. $t_1$ represents the search space of different time scales. $x_a$ is the frame score of action type a. First, find the key frame with the largest frame score, and use sliding windows with different time scales to find the positions on both sides of the key frame. In order to compare the results of different time scales together, a threshold value can be used for selection. The threshold value is the above Sa, and the score value of each sliding window can be calculated, that is, the above calculation Score. Select the target sliding window with the largest score, and use the formula for calculating the probability value corresponding to each preset action type in the target sliding window to determine whether the action type in the target sliding window is action type a. Calculate the probability value of the target sliding window corresponding to each action. If the probability value of the action type a is the largest, the action localization result is retained, otherwise it is discarded.

Compared with a traditional method, the advantage of this method is that the amount of calculation is less, the final score is calculated by the frame score, and no additional reasoning module is required. Considering accuracy and continuity, thresholds are used to make proposals with different time scales comparable.

In an embodiment of the present disclosure, acquiring the action localization result of the video based on the action localization result of the target video segment includes:
if target action types corresponding to two adjacent target action sections in the video are the same, and the time interval between the ending time of q previous target action section and the starting time of a subsequent target action section is not greater than a third preset duration, then aggregating the two target action intervals to obtain the action localization result of the video.

Specifically, aggregating the two target action intervals includes:
taking the starting time of the previous target action interval as the starting time of the aggregated target action interval, and taking the ending time of the subsequent target action interval as the ending time of the aggregated target action interval.

It is understandable that if the target action types corresponding to two adjacent target action intervals in the video are not the same, or the difference between the ending time of the previous target action interval and the starting time of the subsequent target action interval is greater than the third preset duration, then the action localization results of the two target video segments are both output separately as the video action localization results. Here, the third preset duration can be set according to actual needs, for example, it can be set to 1 second.

Figure 13A:
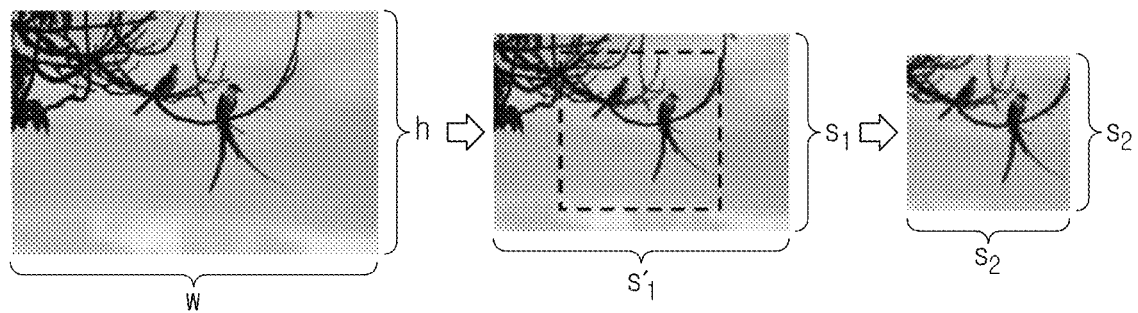
FIG. 13A is a schematic diagram of processing original video image frames in an example of an embodiment.
Figure 13B:
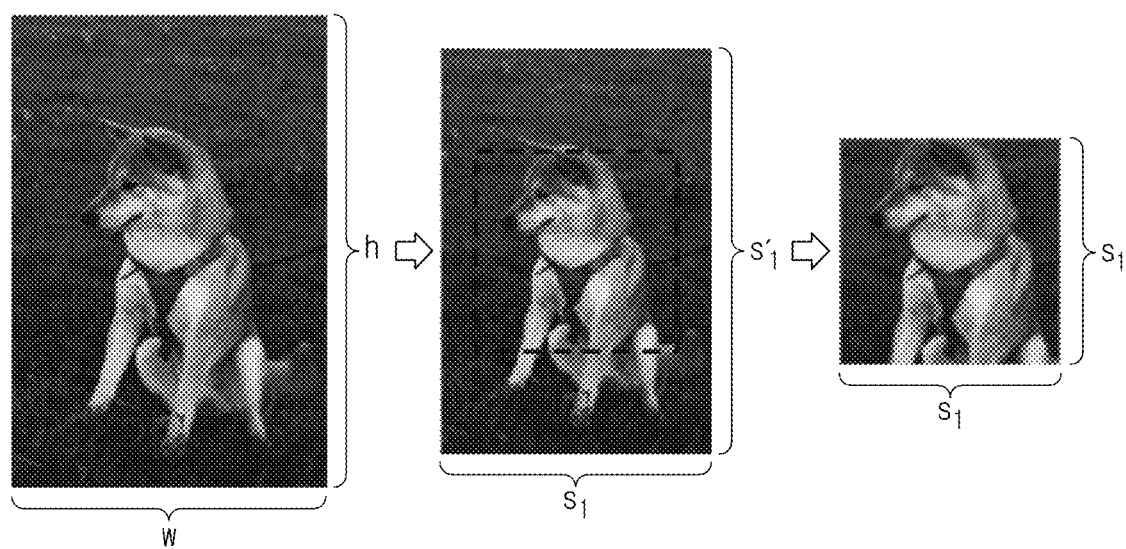
FIG. 13B is a schematic diagram of processing original video image frames in an example of an embodiment.

The following uses an example to illustrate the method of the embodiments of the present disclosure. As shown in FIGS. 13a and 13b, the method can be run on a mobile terminal (such as a mobile phone). The mobile terminal collects the video through an image acquisition device, and the video collected here can be called an original video, and image and video preprocessing may be performed to the original video. In the processing of offline videos and online videos of a mobile device, various formats of frame images in videos obtained through different methods are uniformly converted into RGB format. After the RGB image is obtained, as shown in FIGS. 13a and 13b, the short side of the image (width w, height h) is reduced to a fixed size $s_1$, and the long side of the image is reduced to $s_1'$ according to the formula. Here, the formula is:

$$\begin{cases} l = \min(h, w) \\ \text{ratio} = s_1/l \\ s_1' = \max(h, w) * \text{ratio} \end{cases}$$

After changing the size of the image, the image is cropped, and a $s_2 \times s_2$ square part is intercepted in the image with the center as the origin, as the input of a next-level network. Here, the size of $s_1$ and $s_2$ can be set according to actual needs.

Figure 14:
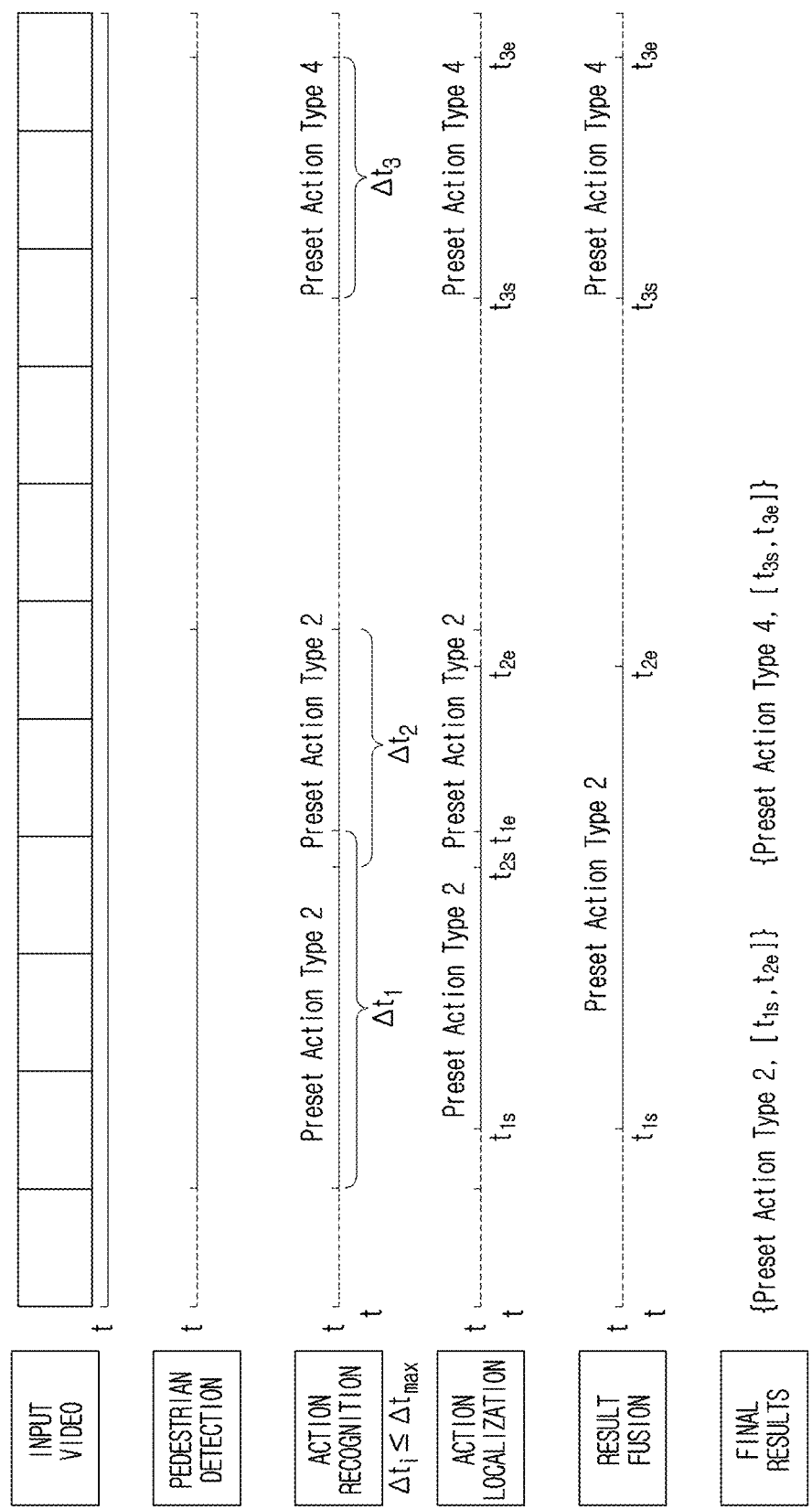
FIG. 14 is a schematic diagram of an inputted video action localization process in an example of an embodiment.

As shown in FIG. 14, after the above processing of the original video, an input video is obtained, and then pedestrian detection is performed on the input video, and three target video segments containing a pedestrian are obtained: $^\Delta t_1$, $^\Delta t_2$ and $^\Delta t_3$ ($^\Delta t_1$, $^\Delta t_2$ and $^\Delta t_3$ are less than or equal to a preset maximum duration $^\Delta t_{max}$). Perform action recognition on three target video segments respectively. The action recognition result of the target video segment $^\Delta t_1$ is a preset action type 2, the action recognition result of the target video segment $^\Delta t_2$ is a preset action type 2, and the action recognition result of the target video segment $^\Delta t_3$ is a preset action type 4. Based on action recognition, perform action localization for each target video segment, that is, obtain a target action interval. Specifically, the target action interval of the target video segment $^\Delta t_1$ is $[t_{1s}, t_{1e}]$, the target action interval of the target video segment $^\Delta t_2$ is $[t_{2e}, t_{2e}]$, and the target action interval of the target video segment $^\Delta t_3$ is $[t_{3e}, t_{3e}]$. After determining the target action interval of each target video segment, perform the result integration of the target video segments that can be integrated. Specifically, since the target action types of the target video segment $^\Delta t_1$ and the target video segment $\Delta t_2$ are the same, and the ending time $t_{1e}$ of the previous target action interval is after the starting time $t_{2s}$ of the subsequent target action interval, that is, the target action intervals of the two target video segments overlap, so they can be aggregated into one action localization result. That is, the target action type is the preset action type 2, and the target action interval is $[t_{1s}, t_{2e}]$. Then, the output final action localization result corresponding to the input video is "{preset action type 2, target action interval $[t_{1s}, t_{2e}]$}, {preset action type 4, target action interval $[t_{1s}, t_{3e}]$}".

The video action localization method provided by the embodiments of the present disclosure can be applied to the following scenarios:

1. Offline processing: for the videos in an album, a certain video can be chosen for action localization processing. After the processing is completed, the user will get multiple video sub-segments, each of which contains one or more actions. The user can select sub-segments to save, analyze, edit, or share in social software according to their needs.
2. Online processing: the user can use a camera to record video on the premise that this function is turned on. In the process of recording a video, the content of the video is being analyzed, and when the video recording is completed, the video action localization result can be given in real time. The content of the action localization result is consistent with offline processing, and the user can process it according to needs.

Figure 15:
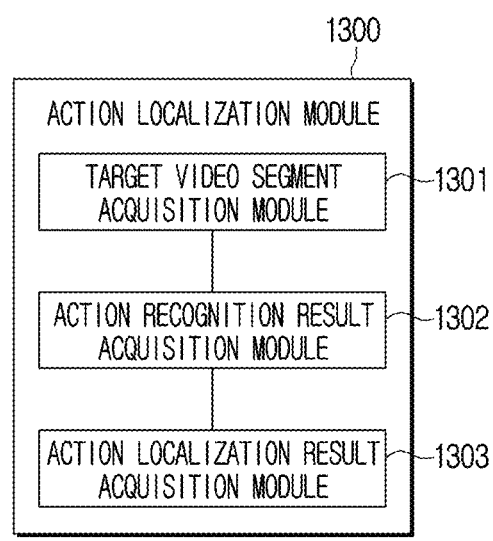
FIG. 15 is a structural block diagram of an action localization device provided by an embodiment.

FIG. 15 is a structural block diagram of an action localization device provided by an embodiment. As shown in FIG. 15, the device 1300 may include: a target video segment acquisition module 1301, an action recognition result acquisition module 1302, and an action localization result acquisition module 1303, where:

the target video segment acquisition module 1301 is used for acquiring at least one target video segment containing a target object in a video;

the action recognition result acquisition module 1302 is used for acquiring a first action recognition result of at least one image frame in the target video segment and a second action recognition result of the target video segment; and the action localization result acquisition module 1303 is used for acquiring an action localization result of the video based on the first action recognition result and the second action recognition result.

In the solution provided by the embodiments of the present disclosure, after acquiring the target video segment containing the target object in the video to be localized, first action recognition results of the multiple image frames in each target video segment and a second action recognition result of the target video segment are acquired. Based on each of the first action recognition results and the second action recognition result, the action localization result of the video to be localized is obtained. The solution does not need to obtain optical flow images during the process of action localization, requires small memory capacity, small calculation amount, and has high accuracy and a wider scope of application.

In an embodiment of the present disclosure, the target video segment acquisition module is specifically used to:

performing target object detection on at least one image frame in the video, and acquiring at least one target video segment based on the target object detection result.

In an embodiment of the present disclosure, the target video segment acquisition module is further used for:

acquiring at least one first image frame from the video, and performing target object detection on the acquired first image frame to obtain a corresponding target object detection result;

if the target object detection result indicates a current first image frame acquired at current moment contains a target object, caching the current first image frame, a previous first image frame relative to the current moment, and an image frame between the current first image frame and the previous first image frame, and if the total number of cached image frames at the current moment is not less than a first preset number, the cached image frames at the current moment are output as a corresponding target video segment; and if the target object detection result indicates that the current first image frame acquired at the current moment does not contain a target object, and if the total number of cached image frames at the current moment is not less than a second preset number, outputting the cached image frames at the current moment as a corresponding target video segment.

In an embodiment of the present disclosure, the device may further include a cache clearing module for:

after outputting the corresponding target video segment, if the target object detection result indicates that the current first image frame acquired at the current moment contains a target object, then retaining a third preset number of the cached image frames before the current first image frame, and clearing other cached image frames; and after outputting the corresponding target video segment, if the target object detection result indicates that the current first image frame acquired at the current moment does not contain a target object, then clearing the cached image frame at the current moment.

In an embodiment of the present disclosure, the action recognition result acquisition module is specifically used for:

acquiring at least one second image frame from the target video segment, and performing action recognition on the acquired at least one second image frame to obtain a corresponding first action recognition result; and based on the first action recognition result, acquiring a second action recognition result.

In an embodiment of the present disclosure, the action recognition result acquisition module is further used for:

extracting spatial information corresponding to the at least one second image frame, and acquiring a corresponding input feature based on the spatial information;

extracting temporal information corresponding to the at least one second image frame based on the input feature using at least one temporal residual module, and acquiring a corresponding output feature based on the input feature and the temporal information; and based on the output feature, acquiring the first action recognition result corresponding to the at least one second image frame.

In an embodiment of the present disclosure, the temporal residual module includes a first branch and a second branch, and the action recognition result acquisition module is further used for:

using the first branch and based on the input feature, acquiring the weight information corresponding to the second image frame, and then acquiring a corresponding first feature including a first temporal information based on the weight information and the input feature;

using the second branch and based on the input feature, acquiring feature information of an adjacent second image frame corresponding to the second image frame, and acquiring a corresponding second feature including a second temporal information based on the feature information of the adjacent second image frame; and based on the first feature and the second feature, acquiring a corresponding output feature.

In an embodiment of the present disclosure, the action recognition result acquisition module is further used for:

aggregating the first action recognition result of the at least one second image frame to obtain the second action recognition result.

In an embodiment of the present disclosure, the first action recognition result includes a first probability value that the actions contained in the corresponding second image frame are of respective preset action types; the second action recognition result includes a second probability value that the actions contained in the corresponding target video segment are of respective preset action types; and the action recognition result acquisition module is further used for:

respectively acquiring an average value of the first probability values corresponding to respective preset action types in the at least one second image frame;

normalizing the average value of the first probability values corresponding to respective preset action types to obtain probability values corresponding to respective preset action types; and taking the probability values of respective preset action types as the second probability value that the actions contained in the target video segment are respective preset action types, that is, acquiring the second action recognition result.

In an embodiment of the present disclosure, the first probability value is a non-normalized log probability Logits value.

In an embodiment of the present disclosure, the action localization result acquisition module includes a first action localization result acquisition sub-module and a second action localization result acquisition sub-module, wherein:

the first action localization result acquisition sub-module is used for based on the first action recognition result and the second action recognition result, acquiring the action localization result of the corresponding target video segment; and the second action localization result acquisition sub-module is used for acquiring the action localization result of the video based on the action localization result of the target video segment.

In an embodiment of the present disclosure, the first action localization result acquisition submodule is specifically used for:

determining at least one candidate proposal based on the first action recognition result and the second action recognition result;

based on each candidate proposal, recognizing a corresponding action interval in the target video segment, and determining a target candidate proposal; and taking an action type corresponding to the target candidate proposal and an action interval corresponding to the target candidate proposal as the action localization result of the target video segment.

In an embodiment of the present disclosure, the first action localization result acquiring submodule is further used for:

based on the first action recognition result and the second action recognition result, determining a proposal threshold corresponding to at least one preset action type; and for each preset action type in the at least one preset action type, determining at least one candidate proposal based on the corresponding proposal threshold and the first action recognition result.

In an embodiment of the present disclosure, for each preset action type in the at least one preset action type, the first action localization result acquiring submodule is further used for:

determining each candidate second image frame, and the first probability value of the preset action type of the action contained in each candidate second image frame is greater than a corresponding proposal threshold; and based on each candidate second image frame, determining at least one candidate proposal.

In an embodiment of the present disclosure, the first action localization result acquiring submodule is further used for:

acquiring a video segment feature corresponding to the target video segment;

based on each candidate proposal, determining a video segment feature of a corresponding action interval, and acquiring a corresponding candidate feature; and recognizing each candidate feature and determining the target candidate proposal.

In an embodiment of the present disclosure, the first action localization result acquiring submodule is further used for:

determining a video segment feature of an action interval corresponding to each candidate proposal; and sampling the video segment features of the respective action intervals corresponding to respective candidate proposals as a feature of a preset length to obtain the corresponding candidate feature.

In an embodiment of the present disclosure, the first action localization result acquiring submodule is further used for:

based on each candidate proposal, recognizing corresponding action intervals in the target video segment, and acquiring action recognition scores corresponding to each candidate proposal;

for each candidate proposal, determining a continuous action recognition score of the candidate proposal according to the action recognition score and action interval corresponding to the candidate proposal; and determining a candidate proposal with the highest continuous action recognition score as the target candidate proposal.

In an embodiment of the present disclosure, the first action localization result acquiring submodule is specifically used for:

determining a target action type in the target video segment based on the second action recognition result;

based on the first action recognition result, acquiring a target key image frame corresponding to the target action type;

acquiring a target action interval corresponding to the target action type based on the target key image frame; and taking the target action type and the corresponding target action interval as the action localization result of the target video segment.

In an embodiment of the present disclosure, the first action localization result acquiring submodule is further used for:

taking a preset action type corresponding to the largest second probability value in the second action recognition result as the target action type.

In an embodiment of the present disclosure, the first action localization result acquiring submodule is further used for:

acquiring a first probability value corresponding to the target action type in the at least one second image frame based on the first action recognition result; and taking a second image frame having the largest first probability value corresponding to the target action type among the at least one second image frame as the target key image frame.

In an embodiment of the present disclosure, the first action localization result acquiring submodule is further used for:

using the width of at least one preset action interval as a window width, performing a window sliding operation on the target video segment to obtain at least one sliding window containing the target key image frame;

acquiring a score value of the sliding window based on the first probability value of the target action type corresponding to the second image frame in the sliding window, and determining a sliding window with the largest score value as a target sliding window;

acquiring a probability value corresponding to each preset action type in the target sliding window based on the first probability value corresponding to each preset action type in the second image frame in the target sliding window; and if a preset action type corresponding to the maximum probability value in the target sliding window is the target action type, then an action interval corresponding to the target sliding window is determined as the target action interval.

In an embodiment of the present disclosure, the second action localization result acquiring submodule is specifically used for:

if target action types corresponding to two adjacent target action sections in the video are the same, and the time interval between the ending time of q previous target action section and the starting time of a subsequent target action section is not greater than a third preset duration, then aggregating the two target action intervals to obtain the action localization result of the video.

In an embodiment of the present disclosure, the second action localization result acquiring submodule is further used for:

taking the starting time of the previous target action interval as the starting time of the aggregated target action interval, and taking the ending time of the subsequent target action interval as the ending time of the aggregated target action interval.

Figure 16:
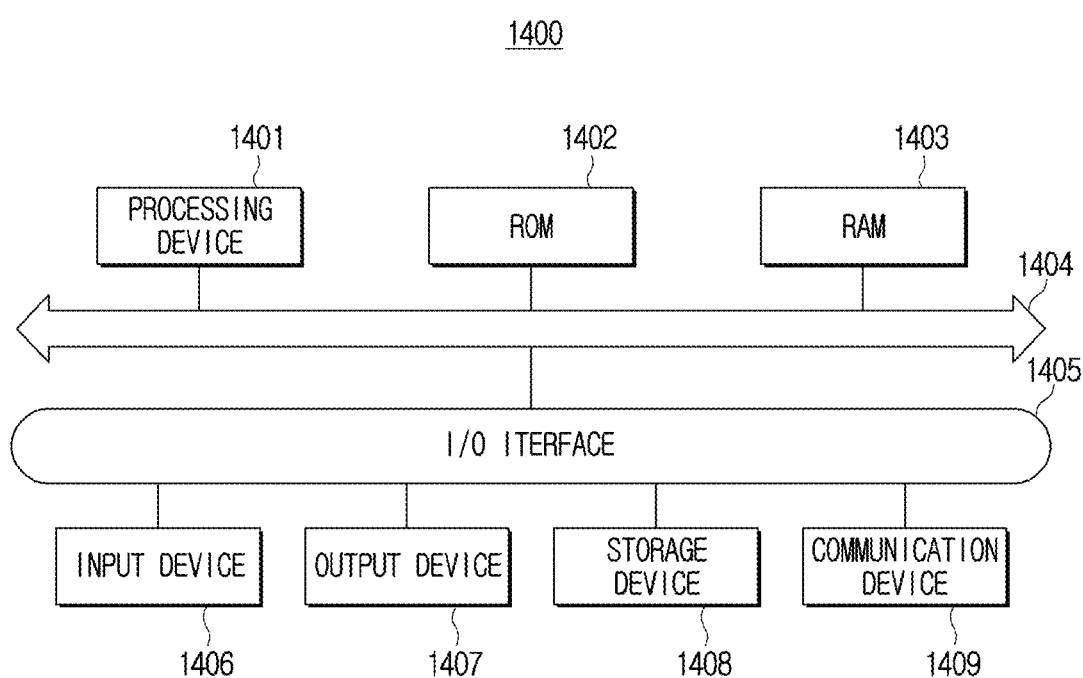
FIG. 16 is a schematic structural diagram of an electronic equipment provided by an embodiment.

Next, refer to FIG. 16, which shows a schematic structural diagram of an electronic equipment (for example, a terminal device or a server that executes the method shown in FIG. 1) 1400 suitable for implementing the embodiments of the present disclosure. The electronic equipment in the embodiments of the present disclosure may include, but are not limited to: mobile terminals, such as mobile phones, notebook computers, digital broadcast receivers, PDAs (personal digital assistants), PADs (tablets), and PMPs (portable multimedia players), vehicle-mounted terminals (such as vehicle navigation terminals), wearable devices, or the like; and fixed terminals, such as digital TVs, desktop computers, or the like. The electronic equipment shown in FIG. 16 is only an example, and should not bring any limitation to the functions and scope of use of the embodiments of the present disclosure.

The electronic equipment includes a memory and a processor, and the memory is used to store programs for executing the methods described in the foregoing method embodiments; and the processor is used for execute the programs stored in the memory. The processor here may be referred to as a processing device 1401 described below, and the memory may include at least one of a read-only memory (ROM) 1402, a random access memory (RAM) 1403, and a storage device 1408, which are specifically described below:

As shown in FIG. 16, the electronic equipment 1400 may include a processing device (such as a central processing unit, a graphics processor, etc.) 1401, and it can perform various appropriate actions and processing according to the program stored in the read only memory (ROM) 1402 or the program loaded from the storage device 1408 to the random access memory (RAM) 1403. Various programs and data required for the operation of the electronic equipment 1400 are also stored in the RAM 1403. The processing device 1401, ROM 1402, and RAM 1403 are connected to each other through a bus 1404. An input/output (I/O) interface 1405 is also connected to the bus 1404.

Generally, the following devices can be connected to the I/O interface 1405: an input device 1406 including such as a touch screen, touch pad, keyboard, mouse, camera, microphone, accelerometer, gyroscope, etc.; an output device 1407 including such as a liquid crystal display (LCD), speaker, vibrator, etc.; a storage device 1408 including, for example, a magnetic tape, hard disk, etc.; and a communication device 1409. The communication device 1409 may allow the electronic equipment 1400 to perform wireless or wired communication with other devices to exchange data. Although FIG. 16 shows an electronic equipment having various devices, it should be understood that it is not required to implement or have all of the illustrated devices. It may alternatively be implemented or provided with more or fewer devices.

In particular, according to the embodiments of the present disclosure, the process described above with reference to the flowchart can be implemented as a computer software program. For example, the embodiments of the present disclosure include a computer program product, which includes a computer program carried on a non-transitory computer-readable medium, and the computer program includes program codes for executing the method shown in the flowchart. In such an embodiment, the computer program may be downloaded and installed from the network through the communication device 1409, or installed from the storage device 1408, or installed from the ROM 1402. When the computer program is executed by the processing device 1401, the above-mentioned functions defined in the method of the embodiments of the present disclosure are executed.

It should be noted that the above-mentioned computer-readable storage medium in the present disclosure may be a computer-readable signal medium or a computer-readable storage medium or any combination of the two. The computer-readable storage medium may be, for example, but not limited to, an electrical, magnetic, optical, electromagnetic, infrared, or semiconductor system, apparatus, or device, or a combination of any of the above. More specific examples of computer-readable storage medium may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In the present disclosure, the computer-readable storage medium may be any tangible medium that contains or stores a program, and the program may be used by an instruction execution system, apparatus, or device, or used in combination therewith. In the present disclosure, the computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination thereof. The computer-readable signal medium may also be any computer-readable medium other than a computer-readable storage medium. The computer-readable signal medium may send, propagate, or transmit a program for use by an instruction execution system, apparatus, or device, or for use in conjunction therewith. The program code contained on the computer-readable medium can be transmitted by any suitable medium, including but not limited to: wire, optical cable, RF (radio frequency), etc., or any suitable combination of the above.

In some embodiments, the client and the server can communicate with any currently known or future-developed network protocol such as HTTP (HyperText Transfer Protocol), and can be interconnected with any form or medium of digital data communication (for example, a communication network). Examples of communication networks include local area networks ("LAN"), wide area networks ("WAN"), the Internet (for example, the Internet), and end-to-end networks (for example, ad hoc end-to-end networks), as well as any currently known or future research and development network of.

The above-mentioned computer-readable medium may be included in the above-mentioned electronic equipment; or it may exist alone without being assembled into the electronic equipment.

The aforementioned computer-readable medium carries one or more programs, and when the aforementioned one or more programs are executed by the electronic equipment, the electronic equipment performs the following steps:

acquiring at least one target video segment containing a target object in a video; acquiring a first action recognition result of at least one image frame in the target video segment and a second action recognition result of the target video segment; and acquiring an action localization result of the video based on the first action recognition result and the second action recognition result.

One or more programming languages or a combination thereof can be used to write computer program codes for performing the operations of the present disclosure. The above-mentioned programming languages include but are not limited to: object-oriented programming languages-such as Java, Smalltalk, C++, and include conventional procedural programming languages-such as "C" language or similar programming languages. The program codes can be executed entirely on the user's computer, partly on the user's computer, executed as an independent software package, partly executed on the user's computer, and partly executed on a remote computer, or entirely executed on a remote computer or server. In case of a remote computer, the remote computer can be connected to the user's computer through any kind of network, including a local area network (LAN) or a wide area network (WAN), or it can be connected to an external computer (for example, using an Internet service provider and through Internet connection).

The flowcharts and block diagrams in the Figures illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of the code contains one or more executable instructions for realizing the specified logic function. It should also be noted that, in some alternative embodiments, the functions marked in the block may also occur in a different order from the order marked in the Figures. For example, two adjacent blocks can be executed substantially in parallel, or they can sometimes be executed in a reverse order, depending on the functions involved. It should also be noted that each block in the block diagram and/or flowchart, and a combination of blocks in the block diagram and/or flowchart, can be implemented by a dedicated hardware-based system that performs the specified function or operation, or they can be implemented by a combination of dedicated hardware and computer instructions.

The modules or units described in the embodiments of the present disclosure can be implemented in software or hardware. Here, the name of a module or unit does not constitute a limitation on the unit itself under certain circumstances. For example, the target tracking status acquisition module can also be described as "a module for acquiring the target tracking status".

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD), or the like.

In the context of the present disclosure, a machine-readable medium may be a tangible medium, which may contain or store a program for use by or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, device, or equipment, or any suitable combination of the foregoing. More specific examples of machine-readable storage media include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

The device provided in the embodiments of the present disclosure can implement at least one of the multiple modules through an AI model. The functions associated with AI can be performed through non-volatile memory, volatile memory, and a processor.

The processor may include one or more processors. At this time, the one or more processors may be general-purpose processors, such as a central processing unit (CPU), an application processor (AP), etc., or a pure graphics processing unit, such as a graphics processing unit (GPU), visual processing unit (VPU), and/or AI dedicated processor, such as neural processing unit (NPU).

The one or more processors control the processing of input data according to predefined operating rules or artificial intelligence (AI) models stored in non-volatile memory and volatile memory. The pre-defined operating rules or artificial intelligence models are provided through training or learning.

Here, providing by learning refers to: acquiring a predefined operating rule or an AI model with desired characteristics by applying a learning algorithm to multiple learning data. This learning may be performed in the device itself in which the AI according to the embodiment is executed, and/or may be implemented by a separate server/system.

The AI model can contain multiple neural network layers. Each neural network layer has multiple weight values, and the calculation of a neural network layer is performed by the calculation result of a previous neural network layer and the multiple weights of the current neural network layer. Examples of neural networks include but are not limited to: Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Network (GAN), and Deep Q Network.

The learning algorithm is a method that uses a plurality of learning data to train a preset target device (for example, a robot) to make, allow, or control the target device to perform determination or prediction. Examples of the learning algorithm include, but are not limited to, supervised learning, unsupervised learning, semi-supervised learning, or reinforcement learning.

Those skilled in the art can clearly understand that for the convenience and conciseness of description, the specific method implemented when the computer-readable medium described above is executed by an electronic equipment can refer to the corresponding process in the foregoing method embodiment. Description thereof is omitted herefrom.

What is claimed is:

1. An action localization method comprising:
    identifying at least one target video segment including a target object in a video;
    acquiring at least one image frame from the at least one target video segment;
    acquiring, by an action recognition network, a first action recognition result of the at least one image frame, the first action recognition result corresponding to a first action recognition score indicating probabilities of at least one preset action type occurring in the at least one image frame,
    acquiring, by the action recognition network, a second action recognition result of the at least one target video segment by aggregating the first action recognition result of the at least one image frame, the second action recognition result corresponding to a second action recognition score indicating probabilities of at least one preset action type occurring in the at least one target video segment;
    acquiring an action localization result of the video based on the first action recognition result and the second action recognition result, the action localization result indicating whether a preset action type occurs in the at least one target video segment; and
    outputting the action localization result,
    wherein the acquiring of the first action recognition result comprises processing an input feature map that represents the at least one image frame through a temporal residual neural network that comprises:
        an attention sub-network configured to apply maximum pooling and average pooling to the input feature map to obtain a first output feature map including attention scores for each of the at least one image frame; and
        a neighbor sub-network configured to extract local temporal information from adjacent frames to obtain a second output feature map including the local temporal information.

2. The action localization method of claim 1, wherein the identifying the at least one target video segment comprises:
    performing target object detection on the video; and
    acquiring the at least one target video segment based on a target object detection result of the performing the target object detection.

3. The action localization method of claim 1, wherein the identifying the at least one target video segment comprises:
    acquiring at least one first image frame from the video, and performing target object detection on the at least one first image frame to obtain a target object detection result;
    based on the target object detection result indicating that a current first image frame acquired at current moment contains the target object, caching the current first image frame, a previous first image frame relative to the current moment, and an intermediate image frame between the current first image frame and the previous first image frame, and based on a total number of cached image frames at the current moment is not less than a first preset number, outputting the cached image frames at the current moment as the at least one target video segment; and
    based on the first target object detection result indicating that the current first image frame acquired at the current moment does not contain the target object, and based on the total number of cached image frames at the current moment is not less than a second preset number, outputting the cached image frames at the current moment as the at least one target video segment.

4. The action localization method of claim 3, further comprising:
    after outputting the at least one target video segment, based on the target object detection result indicating that the current first image frame acquired at the current moment contains the target object, retaining a third preset number of the cached image frames before the current first image frame, and clearing other cached image frames; and
    after outputting the at least one target video segment, based on the target object detection result indicating that the current first image frame acquired at the current moment does not contain the target object, clearing the cached image frame at the current moment.

5. The action localization method of claim 1, wherein the acquiring the first action recognition result and the second action recognition result of the at least one target video segment comprises:
    performing action recognition on the at least one image frame to obtain the first action recognition result.

6. The action localization method of claim 5, wherein the performing the action recognition on the at least one image frame comprises:

extracting spatial information corresponding to the at least one image frame, and acquiring an input feature based on the spatial information;

extracting temporal information corresponding to the at least one image frame based on the input feature using at least one temporal residual neural network, and acquiring an output feature based on the input feature and the temporal information; and based on the output feature, acquiring the first action recognition result corresponding to the at least one image frame.

7. The action localization method of claim 6, wherein the temporal residual neural network comprises a first branch and a second branch; and the extracting the temporal information corresponding to the at least one image frame comprises:

using the first branch and based on the input feature, acquiring weight information corresponding to the at least one image frame, and acquiring a first feature including a first temporal information based on the weight information and the input feature;

using the second branch and based on the input feature, acquiring feature information of an adjacent second image frame that immediately precedes or immediately follows the at least one image frame, and acquiring a second feature including a second temporal information based on the feature information of the adjacent second image frame; and based on the first feature and the second feature, acquiring the output feature.

8. The action localization method of claim 7, wherein the aggregating the first action recognition result comprises:

acquiring an average value of first probabilities that respectively correspond to the at least one preset action type in the at least one image frame;

normalizing the average value of the first probabilities to obtain second probabilities corresponding to the at least one preset action type, respectively; and acquiring the second probabilities as the second action recognition result.

9. The action localization method of claim 8, wherein the first probabilities are non-normalized log probability Logits values.

10. The action localization method of claim 1, wherein the acquiring the action localization result of the video comprises:

based on the first action recognition result and the second action recognition result, acquiring an action localization result of the at least one target video segment; and based on the action localization result of the at least one target video segment, acquiring the action localization result of the video.

11. The action localization method of claim 10, wherein the acquiring the action localization result of the at least one target video segment comprises:

determining at least one candidate proposal based on the first action recognition result and the second action recognition result;

based on each of the at least one candidate proposal, recognizing an action interval in the at least one target video segment, and determining a target candidate proposal; and obtaining an action type corresponding to the target candidate proposal and the action interval corresponding to the target candidate proposal as the action localization result of the at least one target video segment.

12. The action localization method of claim 11, wherein the determining at least one candidate proposal comprises:

based on the first action recognition result and the second action recognition result, determining a proposal threshold corresponding to at least one preset action type; and for each of the at least one preset action type, determining the at least one candidate proposal based on the proposal threshold and the first action recognition result.

13. The action localization method of claim 12, wherein the determining the at least one candidate proposal based on the proposal threshold and the first action recognition result comprises:

determining a probability that at least one candidate second image frame contains the at least one preset action type is greater than the proposal threshold; and based on the at least one candidate second image frame, determining the at least one candidate proposal.

14. The action localization method of claim 11, wherein the recognizing the action interval in the at least one target video segment, and the determining the target candidate proposal comprise:

acquiring a first video segment feature corresponding to the at least one target video segment;

based on each of the at least one candidate proposal, determining a second video segment feature of the action interval; and determining the target candidate proposal based on the first video segment feature and the second video segment feature.

15. An electronic device for processing video data, the electronic device comprising:

a memory storing one or more instructions; and at least one processor configured to execute the one or more instructions to:

identify at least one target video segment containing a target object in a video;

acquire at least one image frame from the at least one target video segment;

acquire, by an action recognition network, a first action recognition result of the at least one image frame, the first action recognition result corresponding to a first action recognition score indicating probabilities of at least one preset action type occurring in the at least one image frame;

acquire, by the action recognition network, a second action recognition result of the at least one target video segment by aggregating the first action recognition result of the at least one image frame, the second action recognition result corresponding to a second action recognition score indicating probabilities of at least one preset action type occurring in the at least one target video segment;

acquire an action localization result of the video based on the first action recognition result and the second action recognition result, the action localization result indicating whether a preset action type occurs in the at least one target video segment; and output the action localization result, wherein the at least one processor configured to execute the one or more instructions to acquire the first action recognition result by processing an input feature map that represents the at least one image frame through a temporal residual neural network that comprises:

an attention sub-network configured to apply maximum pooling and average pooling to the input feature map to obtain a first output feature map including attention scores for each of the at least one image frame; and a neighbor sub-network configured to extract local temporal information from adjacent frames to obtain a second output feature map including the local temporal information.

16. The electronic device of claim 15, wherein the at least one processor is further configured to execute the one or more instructions to:
acquire at least one first image frame from the video, and perform target object detection on the at least one first image frame to obtain a target object detection result;
based on the target object detection result indicating that a current first image frame acquired at current moment contains the target object, cache the current first image frame, a previous first image frame relative to the current moment, and an intermediate image frame between the current first image frame and the previous first image frame; and
based on a total number of cached image frames at the current moment is not less than a first preset number, outputting the cached image frames at the current moment as the at least one target video segment.

17. The electronic device of claim 16, wherein the at least one processor is further configured to execute the one or more instructions to:
after outputting the at least one target video segment, based on the target object detection result indicating that the current first image frame acquired at the current moment contains the target object, retain a preset number of the cached image frames before the current first image frame, and clear other cached image frames.

18. The electronic device of claim 15, wherein the at least one processor is further configured to execute the one or more instructions to:
perform action recognition on the at least one image frame to obtain the first action recognition result.

19. The electronic device of claim 18, wherein the at least one processor is further configured to execute the one or more instructions to:
extract spatial information corresponding to the at least one image frame, and acquire an input feature based on the spatial information;
extract temporal information corresponding to the at least one image frame based on the input feature using at least one temporal residual neural network, and acquire an output feature based on the input feature and the temporal information; and
based on the output feature, acquire the first action recognition result corresponding to the at least one image frame.

* * * * *